US012750487B2

(12) United States Patent
Nam et al.

(10) Patent No.: US 12,750,487 B2
(45) Date of Patent: Sep. 29, 2026

(54) IMAGE ENCODING/DECODING METHOD AND DEVICE, AND RECORDING MEDIUM HAVING BITSTREAM STORED THEREON

(71) Applicant: LG Electronics Inc., Seoul (KR)

(72) Inventors: Junghak Nam, Seoul (KR); Jaehyun Lim, Seoul (KR); Naeri Park, Seoul (KR); Sunmi Yoo, Seoul (KR); Hyeongmoon Jang, Seoul (KR); Jangwon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/725,975

(22) PCT Filed: Dec. 28, 2022

(86) PCT No.: PCT/KR2022/021514
§ 371 (c)(1),
(2) Date: Jul. 1, 2024

(87) PCT Pub. No.: WO2023/132554
PCT Pub. Date: Jul. 13, 2023

(65) Prior Publication Data

US 2025/0080741 A1 Mar. 6, 2025

(30) Foreign Application Priority Data

Jan. 4, 2022 (KR) ........................ 10-2022-0000880
Oct. 14, 2022 (KR) ........................ 10-2022-0132103

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/159* (2014.11);
(Continued)

(58) Field of Classification Search
CPC .. H04N 19/132; H04N 19/105; H04N 19/159; H04N 19/176; H04N 19/196; H04N 19/521
(Continued)

(56) References Cited

U.S. PATENT DOCUMENTS 10,477,205 B1 * 11/2019 Sim ...................... H04N 19/115
12,167,001 B2 * 12/2024 Bordes ................... H04N 19/70
(Continued)

FOREIGN PATENT DOCUMENTS

EP 3751853 A1 12/2020
JP 2021-511698 A 5/2021
(Continued)

*Primary Examiner* — Jayanti K Patel
*Assistant Examiner* — Richard B Carter
(74) *Attorney, Agent, or Firm* — Bryan Cave Leighton Paisner LLP

(57) ABSTRACT

An image decoding/encoding method and device disclosed herein can: acquire prediction samples of the current block; determine a reference area for the current block on the basis of one of a plurality of modes pre-defined in the decoding/encoding device; derive parameters for correcting the prediction samples of the current block, the parameters being derived on the basis of the reference area for the current block; and correct the prediction samples of the current block on the basis of the parameters.

10 Claims, 12 Drawing Sheets

(51) Int. Cl.

| | |
|---|---|
| ***H04N 19/159*** | (2014.01) |
| ***H04N 19/176*** | (2014.01) |
| ***H04N 19/196*** | (2014.01) |
| ***H04N 19/513*** | (2014.01) |

(52) U.S. Cl.
CPC ......... *H04N 19/176* (2014.11); *H04N 19/196* (2014.11); *H04N 19/521* (2014.11)

(58) Field of Classification Search
USPC ........................................ 375/240.16, 240.02
See application file for complete search history.

(56) References Cited

U.S. PATENT DOCUMENTS

| | | | | |
|---|---|---|---|---|
| 2018/0184085 | A1 | 6/2018 | Yang et al. | |
| 2019/0141318 | A1* | 5/2019 | Li ........................ | H04N 19/159 |
| 2020/0280727 | A1 | 9/2020 | Bordes et al. | |
| 2021/0289201 | A1 | 9/2021 | Bang et al. | |
| 2023/0108639 | A1* | 4/2023 | Ahn ..................... | H04N 19/117 375/240.02 |
| 2023/0396780 | A1* | 12/2023 | Wang ..................... | H04N 19/70 |

FOREIGN PATENT DOCUMENTS

| | | | |
|---|---|---|---|
| KR | 10-2018-0005120 | A | 1/2018 |
| KR | 10-2018-0074000 | A | 7/2018 |
| KR | 10-2019-0033624 | A | 3/2019 |
| KR | 10-2020-0010113 | A | 1/2020 |

* cited by examiner

IMAGE ENCODING/DECODING METHOD AND DEVICE, AND RECORDING MEDIUM HAVING BITSTREAM STORED THEREON

CROSS-REFERENCE TO RELATED APPLICATIONS

This application is the National Stage filing under 35 U.S.C. 371 of International Application No. PCT/KR2022/021514, filed on Dec. 28, 2022, which claims the benefit of earlier filing date and right of priority to Korean Application No. 10-2022-0000880, filed on Jan. 4, 2022, and Korean Application No. 10-2022-0132103, filed on Oct. 14, 2022, the contents of which are all incorporated by reference herein in their entireties.

TECHNICAL FIELD

The present disclosure relates to an image encoding/decoding method and apparatus, and a recording medium storing a bitstream.

BACKGROUND

Recently, the demand for high-resolution and high-quality images such as HD (High Definition) images and UHD (Ultra High Definition) images has been increasing in various application fields, and accordingly, highly efficient image compression technologies are being discussed.

There are a variety of technologies such as inter-prediction technology that predicts a sample value included in a current picture from a picture before or after a current picture with video compression technology, intra-prediction technology that predicts a sample value included in a current picture by using sample information in a current picture, entropy coding technology that allocates a short sign to a value with high appearance frequency and a long sign to a value with low appearance frequency, etc. and these image compression technologies may be used to effectively compress image data and transmit or store it.

SUMMARY

The present disclosure provides a method and apparatus for determining a parameter for modification of a prediction/reconstruction sample.

The present disclosure provides a method and apparatus for determining a reference region for deriving a parameter.

The present disclosure provides a method and apparatus for selectively using some samples in a reference region.

The present disclosure provides a method and apparatus for modifying a prediction/reconstruction sample based on a parameter.

The present disclosure provides a method and apparatus for signaling modification-related information of a prediction/reconstruction sample.

The present disclosure provides a method and an apparatus for propagating a mode used to derive information and/or a parameter regarding whether a prediction/reconstruction sample is modified.

An image decoding method and apparatus according to the present disclosure may obtain a prediction sample of a current block, determine a first reference region for the current block based on any one of a plurality of modes pre-defined in a decoding apparatus, derive a first parameter for modifying the prediction sample of the current block based on the first reference region for the current block, and modify the prediction sample of the current block based on the first parameter to obtain a modified prediction sample.

In an image decoding method and apparatus according to the present disclosure, the plurality of modes may include at least two of a first mode in which a top neighboring region and a left neighboring region of the current block are used as the reference region, a second mode in which a left neighboring region of the current block is used as the reference region, or a third mode in which a top neighboring region of the current block is used as the reference region.

In an image decoding method and apparatus according to the present disclosure, the left neighboring region of the second mode may include a sample line that is not adjacent to the current block, and the top neighboring region of the third mode may include a sample line that is not adjacent to the current block.

In an image decoding method and apparatus according to the present disclosure, the plurality of modes may include at least two of a first mode in which a first sample line adjacent to the current block is used as the reference region, a second mode in which a second sample line that is not adjacent to the current block and is adjacent to the first sample line is used as the reference region, or a third mode in which a third sample line that is not adjacent to the current block and is adjacent to the second sample line is used as the reference region.

In an image decoding method and apparatus according to the present disclosure, the any one of the plurality of modes is determined based on encoding information of a neighboring block adjacent to the current block, and the encoding information may include at least one of a quantization parameter, a prediction mode, or motion information.

In an image decoding method and apparatus according to the present disclosure, the first parameter may be derived based on one or more samples selected from samples belonging to the reference region, and the one or more samples may be selected based on at least one of a size of the current block, sub-sampling for the reference region, or a representative sample of samples belonging to the reference region.

An image decoding method and apparatus according to the present disclosure, an additional reference region for the current block may be determined based on another one of the plurality of modes, and a second parameter for modifying the prediction sample of the current block may be derived based on the additional reference region for the current block, and a final parameter applied to the current block may be derived based on the first parameter and the second parameter. Here, the modified prediction sample may be obtained by applying the final parameter to the prediction sample.

In an image decoding method and apparatus according to the present disclosure, a region to which the first parameter is applied within the current block may be determined based on one or more types pre-defined in the decoding apparatus.

In an image decoding method and apparatus according to the present disclosure, the one or more types may include at least one of a first type in which the region to which the first parameter is applied has the same size as the current block, a second type in which the region to which the first parameter is applied is any one of two sub-regions generated by dividing the current block based on a horizontal division line, a third type in which the region to which the first parameter is applied is any one of two sub-regions generated by dividing the current block based on a vertical division line, a fourth type in which the region to which the first parameter is applied is a region excluding a bottom-right sub-region within the current block, or a fifth type in which the region to which the first parameter is applied is any one of two sub-regions generated by dividing the current block based on a division line having a predetermined angle.

In an image decoding method and apparatus according to the present disclosure, a region to which the first parameter is applied within the current block may be determined based on encoding information of at least one of the current block or a neighboring block adjacent to the current block, and the encoding information may include at least one of a quantization parameter, a prediction mode, or motion information.

An image decoding method and apparatus according to the present disclosure may configure a merge candidate list of the current block based on an inter prediction mode of the current block, and derive motion information of the current block based on one candidate selected from the merge candidate list. Here, whether to modify the prediction sample may be determined based on the inter prediction mode of the current block or the selected one candidate.

An image encoding method and apparatus according to the present disclosure may obtain a prediction sample of a current block, determine a first reference region for the current block based on any one of a plurality of modes pre-defined in an encoding apparatus, derive a first parameter for modifying the prediction sample of the current block based on the first reference region for the current block, and modify the prediction sample of the current block based on the first parameter to obtain a modified prediction sample.

In an image encoding method and apparatus according to the present disclosure, the plurality of modes may include at least two of a first mode in which a top neighboring region and a left neighboring region of the current block are used as the reference region, a second mode in which a left neighboring region of the current block is used as the reference region, or a third mode in which a top neighboring region of the current block is used as the reference region.

In an image encoding method and apparatus according to the present disclosure, the left neighboring region of the second mode may include a sample line that is not adjacent to the current block, and the top neighboring region of the third mode may include a sample line that is not adjacent to the current block.

In an image encoding method and apparatus according to the present disclosure, the plurality of modes may include at least two of a first mode in which a first sample line adjacent to the current block is used as the reference region, a second mode in which a second sample line that is not adjacent to the current block and is adjacent to the first sample line is used as the reference region, or a third mode in which a third sample line that is not adjacent to the current block and is adjacent to the second sample line is used as the reference region.

In an image encoding method and apparatus according to the present disclosure, the any one of the plurality of modes is determined based on encoding information of a neighboring block adjacent to the current block, and the encoding information may include at least one of a quantization parameter, a prediction mode, or motion information.

In an image encoding method and apparatus according to the present disclosure, the first parameter may be derived based on one or more samples selected from samples belonging to the reference region, and the one or more samples may be selected based on at least one of a size of the current block, sub-sampling for the reference region, or a representative sample of samples belonging to the reference region.

An image encoding method and apparatus according to the present disclosure, an additional reference region for the current block may be determined based on another one of the plurality of modes, and a second parameter for modifying the prediction sample of the current block may be derived based on the additional reference region for the current block, and a final parameter applied to the current block may be derived based on the first parameter and the second parameter. Here, the modified prediction sample may be obtained by applying the final parameter to the prediction sample.

In an image encoding method and apparatus according to the present disclosure, a region to which the first parameter is applied within the current block may be determined based on one or more types pre-defined in the encoding apparatus.

In an image encoding method and apparatus according to the present disclosure, the one or more types may include at least one of a first type in which the region to which the first parameter is applied has the same size as the current block, a second type in which the region to which the first parameter is applied is any one of two sub-regions generated by dividing the current block based on a horizontal division line, a third type in which the region to which the first parameter is applied is any one of two sub-regions generated by dividing the current block based on a vertical division line, a fourth type in which the region to which the first parameter is applied is a region excluding a bottom-right sub-region within the current block, or a fifth type in which the region to which the first parameter is applied is any one of two sub-regions generated by dividing the current block based on a division line having a predetermined angle.

In an image encoding method and apparatus according to the present disclosure, a region to which the first parameter is applied within the current block may be determined based on encoding information of at least one of the current block or a neighboring block adjacent to the current block, and the encoding information may include at least one of a quantization parameter, a prediction mode, or motion information.

An image encoding method and apparatus according to the present disclosure may configure a merge candidate list of the current block based on an inter prediction mode of the current block, and derive motion information of the current block based on one candidate selected from the merge candidate list. Here, whether to modify the prediction sample may be determined based on the inter prediction mode of the current block or the selected one candidate.

A method and a device for transmitting data for image information according to the present disclosure may obtain a prediction sample of a current block, determine a first reference region for the current block based on any one of a plurality of modes pre-defined in an encoding apparatus, derive a first parameter for modifying the prediction sample of the current block based on the first reference region for the current block, modify a prediction sample of the current block based on the first parameter to obtain a modified prediction sample, encode the current block to generate a bitstream based on the modified prediction sample, and transmit data including the bitstream.

A computer-readable digital storage medium storing encoded video/image information that causes performing the image decoding method by a decoding apparatus according to the present disclosure is provided.

A computer-readable digital storage medium storing video/image information generated according to the image encoding method according to the present disclosure is provided.

According to the present disclosure, the parameter for modification of the prediction/reconstruction sample may be efficiently determined, and through this, modification accuracy may be improved.

According to the present disclosure, the efficiency of image coding may be improved by adaptively using a reference region for deriving the parameter.

According to the present disclosure, by selectively using some samples in the reference region, the complexity of operation and implementation may be reduced and coding efficiency may be improved.

According to the present disclosure, the accuracy of prediction/reconstruction may be increased and the residual signal may be reduced by modifying the prediction/reconstruction sample based on the parameter.

According to the present disclosure, information related to modification of the prediction/reconstruction sample may be efficiently signaled.

According to the present disclosure, whether to modify a prediction/reconstructed sample and a mode used to derive a parameter may be efficiently determined.

BRIEF DESCRIPTION OF THE DRAWINGS

FIG. 7 illustrates the position of a sample in a reference region selected to derive the parameter for a plurality of modes according to an embodiment of the present disclosure.

FIG. 8 illustrates a method for modifying a prediction sample according to an embodiment of the present disclosure.

DETAILED DESCRIPTION

Figure 1:
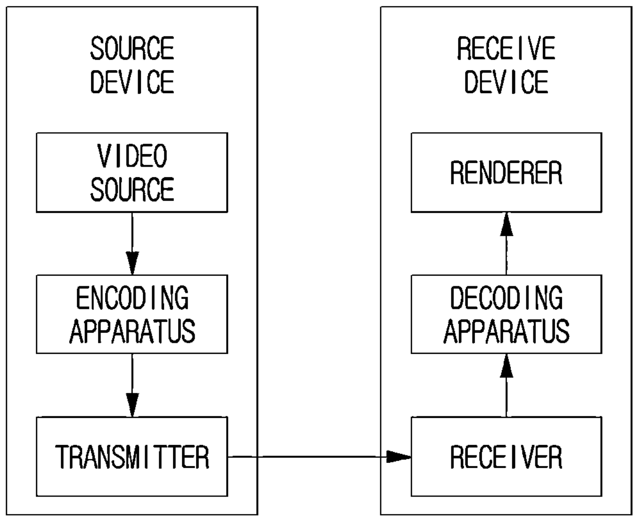
FIG. 1 shows a video/image coding system according to the present disclosure.

Since the present disclosure may make various changes and have several embodiments, specific embodiments will be illustrated in a drawing and described in detail in a detailed description. However, it is not intended to limit the present disclosure to a specific embodiment, and should be understood to include all changes, equivalents and substitutes included in the spirit and technical scope of the present disclosure. While describing each drawing, similar reference numerals are used for similar components.

A term such as first, second, etc. may be used to describe various components, but the components should not be limited by the terms. The terms are used only to distinguish one component from other components. For example, a first component may be referred to as a second component without departing from the scope of a right of the present disclosure, and similarly, a second component may also be referred to as a first component. A term of and/or includes any of a plurality of related stated items or a combination of a plurality of related stated items.

When a component is referred to as "being connected" or "being linked" to another component, it should be understood that it may be directly connected or linked to another component, but another component may exist in the middle. On the other hand, when a component is referred to as "being directly connected" or "being directly linked" to another component, it should be understood that there is no another component in the middle.

A term used in this application is just used to describe a specific embodiment, and is not intended to limit the present disclosure. Singular expressions include plural expressions unless the context clearly dictates otherwise. In this application, it should be understood that a term such as "include" or "have", etc. is intended to designate the presence of features, numbers, steps, operations, components, parts or combinations thereof described in the specification, but does not exclude in advance the possibility of presence or addition of one or more other features, numbers, steps, operations, components, parts or combinations thereof.

The present disclosure relates to video/image coding. For example, a method/an embodiment disclosed herein may be applied to a method disclosed in the versatile video coding (VVC) standard. In addition, a method/an embodiment disclosed herein may be applied to a method disclosed in the essential video coding (EVC) standard, the AOMedia Video 1 (AV1) standard, the 2nd generation of audio video coding standard (AVS2) or the next-generation video/image coding standard (ex. H.267 or H.268, etc.).

This specification proposes various embodiments of video/image coding, and unless otherwise specified, the embodiments may be performed in combination with each other.

Herein, a video may refer to a set of a series of images over time. A picture generally refers to a unit representing one image in a specific time period, and a slice/a tile is a unit that forms part of a picture in coding. A slice/a tile may include at least one coding tree unit (CTU). One picture may consist of at least one slice/tile. One tile is a rectangular region composed of a plurality of CTUs within a specific tile column and a specific tile row of one picture. A tile column is a rectangular region of CTUs having the same height as that of a picture and a width designated by a syntax requirement of a picture parameter set. A tile row is a rectangular region of CTUs having a height designated by a picture parameter set and the same width as that of a picture. CTUs within one tile may be arranged consecutively according to CTU raster scan, while tiles within one picture may be arranged consecutively according to raster scan of a tile. One slice may include an integer number of complete tiles or an integer number of consecutive complete CTU rows within a tile of a picture that may be included exclusively in a single NAL unit. Meanwhile, one picture may be divided into at least two sub-pictures. A sub-picture may be a rectangular region of at least one slice within a picture.

A pixel, a pixel or a pel may refer to the minimum unit that constitutes one picture (or image). In addition, 'sample' may be used as a term corresponding to a pixel. A sample may generally represent a pixel or a pixel value, and may represent only a pixel/a pixel value of a luma component, or only a pixel/a pixel value of a chroma component.

A unit may represent a basic unit of image processing. A unit may include at least one of a specific region of a picture and information related to a corresponding region. One unit may include one luma block and two chroma (ex. cb, cr) blocks. In some cases, a unit may be used interchangeably with a term such as a block or an region, etc. In a general case, a M×N block may include a set (or an array) of transform coefficients or samples (or sample arrays) consisting of M columns and N rows.

Herein, "A or B" may refer to "only A", "only B" or "both A and B." In other words, herein, "A or B" may be interpreted as "A and/or B." For example, herein, "A, B or C" may refer to "only A", "only B", "only C" or "any combination of A, B and C)".

A slash (/) or a comma used herein may refer to "and/or." For example, "A/B" may refer to "A and/or B." Accordingly, "A/B" may refer to "only A", "only B" or "both A and B." For example, "A, B, C" may refer to "A, B, or C".

Herein, "at least one of A and B" may refer to "only A", "only B" or "both A and B". In addition, herein, an expression such as "at least one of A or B" or "at least one of A and/or B" may be interpreted in the same way as "at least one of A and B".

In addition, herein, "at least one of A, B and C" may refer to "only A", "only B", "only C", or "any combination of A, B and C". In addition, "at least one of A, B or C" or "at least one of A, B and/or C" may refer to "at least one of A, B and C".

In addition, a parenthesis used herein may refer to "for example." Specifically, when indicated as "prediction (intra prediction)", "intra prediction" may be proposed as an example of "prediction". In other words, "prediction" herein is not limited to "intra prediction" and "intra prediction" may be proposed as an example of "prediction." In addition, even when indicated as "prediction (i.e., intra prediction)", "intra prediction" may be proposed as an example of "prediction."

Herein, a technical feature described individually in one drawing may be implemented individually or simultaneously.

FIG. 1 shows a video/image coding system according to the present disclosure.

Referring to FIG. 1, a video/image coding system may include a first device (a source device) and a second device (a receiving device).

A source device may transmit encoded video/image information or data in a form of a file or streaming to a receiving device through a digital storage medium or a network. The source device may include a video source, an encoding apparatus and a transmission unit. The receiving device may include a reception unit, a decoding apparatus and a renderer. The encoding apparatus may be referred to as a video/image encoding apparatus and the decoding apparatus may be referred to as a video/image decoding apparatus. A transmitter may be included in an encoding apparatus. A receiver may be included in a decoding apparatus. A renderer may include a display unit, and a display unit may be composed of a separate device or an external component.

A video source may acquire a video/an image through a process of capturing, synthesizing or generating a video/an image. A video source may include a device of capturing a video/an image and a device of generating a video/an image. A device of capturing a video/an image may include at least one camera, a video/image archive including previously captured videos/images, etc. A device of generating a video/an image may include a computer, a tablet, a smartphone, etc. and may (electronically) generate a video/an image. For example, a virtual video/image may be generated through a computer, etc., and in this case, a process of capturing a video/an image may be replaced by a process of generating related data.

An encoding apparatus may encode an input video/image. An encoding apparatus may perform a series of procedures such as prediction, transform, quantization, etc. for compression and coding efficiency. Encoded data (encoded video/image information) may be output in a form of a bitstream.

A transmission unit may transmit encoded video/image information or data output in a form of a bitstream to a reception unit of a receiving device through a digital storage medium or a network in a form of a file or streaming. A digital storage medium may include various storage media such as USB, SD, CD, DVD, Blu-ray, HDD, SSD, etc. A transmission unit may include an element for generating a media file through a predetermined file format and may include an element for transmission through a broadcasting/communication network. A reception unit may receive/extract the bitstream and transmit it to a decoding apparatus.

A decoding apparatus may decode a video/an image by performing a series of procedures such as dequantization, inverse transform, prediction, etc. corresponding to an operation of an encoding apparatus.

A renderer may render a decoded video/image. A rendered video/image may be displayed through a display unit.

Figure 2:
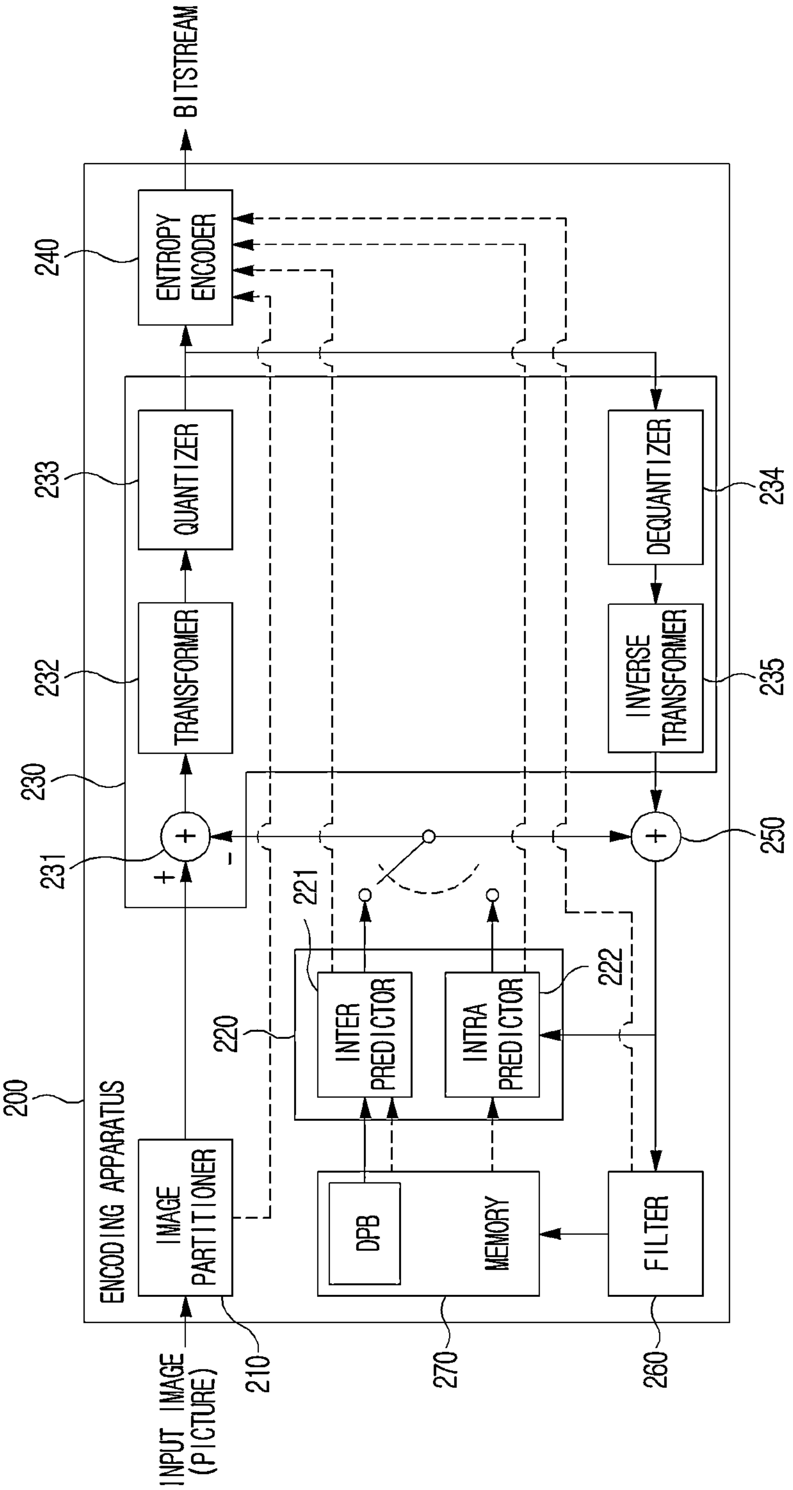
FIG. 2 shows a schematic block diagram of an encoding apparatus to which an embodiment of the present disclosure is applicable and encoding of video/image signals is performed.

FIG. 2 shows a rough block diagram of an encoding apparatus to which an embodiment of the present disclosure may be applied and encoding of a video/image signal is performed.

Referring to FIG. 2, an encoding apparatus 200 may be composed of an image partitioner 210, a predictor 220, a residual processor 230, an entropy encoder 240, an adder 250, a filter 260 and a memory 270. A predictor 220 may include an inter predictor 221 and an intra predictor 222. A residual processor 230 may include a transformer 232, a quantizer 233, a dequantizer 234 and an inverse transformer 235. A residual processor 230 may further include a subtractor 231. An adder 250 may be referred to as a reconstructor or a reconstructed block generator. The above-described image partitioner 210, predictor 220, residual processor 230, entropy encoder 240, adder 250 and filter 260 may be configured by at least one hardware component (e.g., an encoder chipset or a processor) according to an embodiment. In addition, a memory 270 may include a decoded picture buffer (DPB) and may be configured by a digital storage medium. The hardware component may further include a memory 270 as an internal/external component.

An image partitioner 210 may partition an input image (or picture, frame) input to an encoding apparatus 200 into at least one processing unit. As an example, the processing unit may be referred to as a coding unit (CU). In this case, a coding unit may be partitioned recursively according to a quad-tree binary-tree ternary-tree (QTBTTT) structure from a coding tree unit (CTU) or the largest coding unit (LCU).

For example, one coding unit may be partitioned into a plurality of coding units with a deeper depth based on a quad tree structure, a binary tree structure and/or a ternary structure. In this case, for example, a quad tree structure may be applied first and a binary tree structure and/or a ternary structure may be applied later.

Alternatively, a binary tree structure may be applied before a quad tree structure. A coding procedure according to this specification may be performed based on a final coding unit that is no longer partitioned. In this case, based on coding efficiency, etc. according to an image characteristic, the largest coding unit may be directly used as a final coding unit, or if necessary, a coding unit may be recursively partitioned into coding units of a deeper depth, and a coding unit with an optimal size may be used as a final coding unit. Here, a coding procedure may include a procedure such as prediction, transform, and reconstruction, etc. described later.

As another example, the processing unit may further include a prediction unit (PU) or a transform unit (TU). In this case, the prediction unit and the transform unit may be divided or partitioned from a final coding unit described above, respectively. The prediction unit may be a unit of sample prediction, and the transform unit may be a unit for deriving a transform coefficient and/or a unit for deriving a residual signal from a transform coefficient.

In some cases, a unit may be used interchangeably with a term such as a block or an region, etc. In a general case, a M×N block may represent a set of transform coefficients or samples consisting of M columns and N rows. A sample may generally represent a pixel or a pixel value, and may represent only a pixel/a pixel value of a luma component, or only a pixel/a pixel value of a chroma component. A sample may be used as a term that makes one picture (or image) correspond to a pixel or a pel.

An encoding apparatus 200 may subtract a prediction signal (a prediction block, a prediction sample array) output from an inter predictor 221 or an intra predictor 222 from an input image signal (an original block, an original sample array) to generate a residual signal (a residual signal, a residual sample array), and a generated residual signal is transmitted to a transformer 232. In this case, a unit that subtracts a prediction signal (a prediction block, a prediction sample array) from an input image signal (an original block, an original sample array) within an encoding apparatus 200 may be referred to as a subtractor 231.

A predictor 220 may perform prediction on a block to be processed (hereinafter, referred to as a current block) and generate a predicted block including prediction samples for the current block. A predictor 220 may determine whether intra prediction or inter prediction is applied in a unit of a current block or a CU. A predictor 220 may generate various information on prediction such as prediction mode information, etc. and transmit it to an entropy encoder 240 as described later in a description of each prediction mode. Information on prediction may be encoded in an entropy encoder 240 and output in a form of a bitstream.

An intra predictor 222 may predict a current block by referring to samples within a current picture. The samples referred to may be positioned in the neighborhood of the current block or may be positioned a certain distance away from the current block according to a prediction mode. In intra prediction, prediction modes may include at least one nondirectional mode and a plurality of directional modes. A nondirectional mode may include at least one of a DC mode or a planar mode. A directional mode may include 33 directional modes or 65 directional modes according to a detail level of a prediction direction. However, it is an example, and more or less directional modes may be used according to a configuration. An intra predictor 222 may determine a prediction mode applied to a current block by using a prediction mode applied to a neighboring block.

An inter predictor 221 may derive a prediction block for a current block based on a reference block (a reference sample array) specified by a motion vector on a reference picture. In this case, in order to reduce the amount of motion information transmitted in an inter prediction mode, motion information may be predicted in a unit of a block, a sub-block or a sample based on the correlation of motion information between a neighboring block and a current block. The motion information may include a motion vector and a reference picture index. The motion information may further include inter prediction direction information (L0 prediction, Li prediction, Bi prediction, etc.). For inter prediction, a neighboring block may include a spatial neighboring block existing in a current picture and a temporal neighboring block existing in a reference picture. A reference picture including the reference block and a reference picture including the temporal neighboring block may be the same or different. The temporal neighboring block may be referred to as a collocated reference block, a collocated CU (colCU), etc., and a reference picture including the temporal neighboring block may be referred to as a collocated picture (colPic). For example, an inter predictor 221 may configure a motion information candidate list based on neighboring blocks and generate information indicating which candidate is used to derive a motion vector and/or a reference picture index of the current block. Inter prediction may be performed based on various prediction modes, and for example, for a skip mode and a merge mode, an inter predictor 221 may use motion information of a neighboring block as motion information of a current block. For a skip mode, unlike a merge mode, a residual signal may not be transmitted. For a motion vector prediction (MVP) mode, a motion vector of a neighboring block is used as a motion vector predictor and a motion vector difference is signaled to indicate a motion vector of a current block.

A predictor 220 may generate a prediction signal based on various prediction methods described later. For example, a predictor may not only apply intra prediction or inter prediction for prediction for one block, but also may apply intra prediction and inter prediction simultaneously. It may be referred to as a combined inter and intra prediction (CIIP) mode. In addition, a predictor may be based on an intra block copy (IBC) prediction mode or may be based on a palette mode for prediction for a block. The IBC prediction mode or palette mode may be used for content image/video coding of a game, etc. such as screen content coding (SCC), etc. IBC basically performs prediction within a current picture, but it may be performed similarly to inter prediction in that it derives a reference block within a current picture. In other words, IBC may use at least one of inter prediction techniques described herein. A palette mode may be considered as an example of intra coding or intra prediction. When a palette mode is applied, a sample value within a picture may be signaled based on information on a palette table and a palette index. A prediction signal generated through the predictor 220 may be used to generate a reconstructed signal or a residual signal.

A transformer 232 may generate transform coefficients by applying a transform technique to a residual signal. For example, a transform technique may include at least one of Discrete Cosine Transform (DCT), Discrete Sine Transform (DST), Karhunen-Loeve Transform (KLT), Graph-Based Transform (GBT) or Conditionally Non-linear Transform (CNT). Here, GBT refers to transform obtained from this graph when relationship information between pixels is expressed as a graph. CNT refers to transform obtained based on generating a prediction signal by using all previously reconstructed pixels. In addition, a transform process may be applied to a square pixel block in the same size or may be applied to a non-square block in a variable size.

A quantizer 233 may quantize transform coefficients and transmit them to an entropy encoder 240 and an entropy encoder 240 may encode a quantized signal (information on quantized transform coefficients) and output it as a bitstream. Information on the quantized transform coefficients may be referred to as residual information. A quantizer 233 may rearrange quantized transform coefficients in a block form into an one-dimensional vector form based on coefficient scan order, and may generate information on the quantized transform coefficients based on the quantized transform coefficients in the one-dimensional vector form.

An entropy encoder 240 may perform various encoding methods such as exponential Golomb, context-adaptive variable length coding (CAVLC), context-adaptive binary arithmetic coding (CABAC), etc. An entropy encoder 240 may encode information necessary for video/image reconstruction (e.g., a value of syntax elements, etc.) other than quantized transform coefficients together or separately.

Encoded information (ex. encoded video/image information) may be transmitted or stored in a unit of a network abstraction layer (NAL) unit in a bitstream form. The video/image information may further include information on various parameter sets such as an adaptation parameter set (APS), a picture parameter set (PPS), a sequence parameter set (SPS) or a video parameter set (VPS), etc. In addition, the video/image information may further include general constraint information. Herein, information and/or syntax elements transmitted/signaled from an encoding apparatus to a decoding apparatus may be included in video/image information. The video/image information may be encoded through the above-described encoding procedure and included in the bitstream. The bitstream may be transmitted through a network or may be stored in a digital storage medium. Here, a network may include a broadcasting network and/or a communication network, etc. and a digital storage medium may include various storage media such as USB, SD, CD, DVD, Blu-ray, HDD, SSD, etc. A transmission unit (not shown) for transmitting and/or a storage unit (not shown) for storing a signal output from an entropy encoder 240 may be configured as an internal/external element of an encoding apparatus 200, or a transmission unit may be also included in an entropy encoder 240.

Quantized transform coefficients output from a quantizer 233 may be used to generate a prediction signal. For example, a residual signal (a residual block or residual samples) may be reconstructed by applying dequantization and inverse transform to quantized transform coefficients through a dequantizer 234 and an inverse transformer 235. An adder 250 may add a reconstructed residual signal to a prediction signal output from an inter predictor 221 or an intra predictor 222 to generate a reconstructed signal (a reconstructed picture, a reconstructed block, a reconstructed sample array). When there is no residual for a block to be processed like when a skip mode is applied, a predicted block may be used as a reconstructed block. An adder 250 may be referred to as a reconstructor or a reconstructed block generator. A generated reconstructed signal may be used for intra prediction of a next block to be processed within a current picture, and may be also used for inter prediction of a next picture through filtering as described later. Meanwhile, luma mapping with chroma scaling (LMCS) may be applied in a picture encoding and/or reconstruction process.

A filter 260 may improve subjective/objective image quality by applying filtering to a reconstructed signal. For example, a filter 260 may generate a modified reconstructed picture by applying various filtering methods to a reconstructed picture, and may store the modified reconstructed picture in a memory 270, specifically in a DPB of a memory 270. The various filtering methods may include deblocking filtering, sample adaptive offset, adaptive loop filter, bilateral filter, etc. A filter 260 may generate various information on filtering and transmit it to an entropy encoder 240. Information on filtering may be encoded in an entropy encoder 240 and output in a form of a bitstream.

A modified reconstructed picture transmitted to a memory 270 may be used as a reference picture in an inter predictor 221. When inter prediction is applied through it, an encoding apparatus may avoid prediction mismatch in an encoding apparatus 200 and a decoding apparatus, and may also improve encoding efficiency.

A DPB of a memory 270 may store a modified reconstructed picture to use it as a reference picture in an inter predictor 221. A memory 270 may store motion information of a block from which motion information in a current picture is derived (or encoded) and/or motion information of blocks in a pre-reconstructed picture. The stored motion information may be transmitted to an inter predictor 221 to be used as motion information of a spatial neighboring block or motion information of a temporal neighboring block. A memory 270 may store reconstructed samples of reconstructed blocks in a current picture and transmit them to an intra predictor 222.

Figure 3:
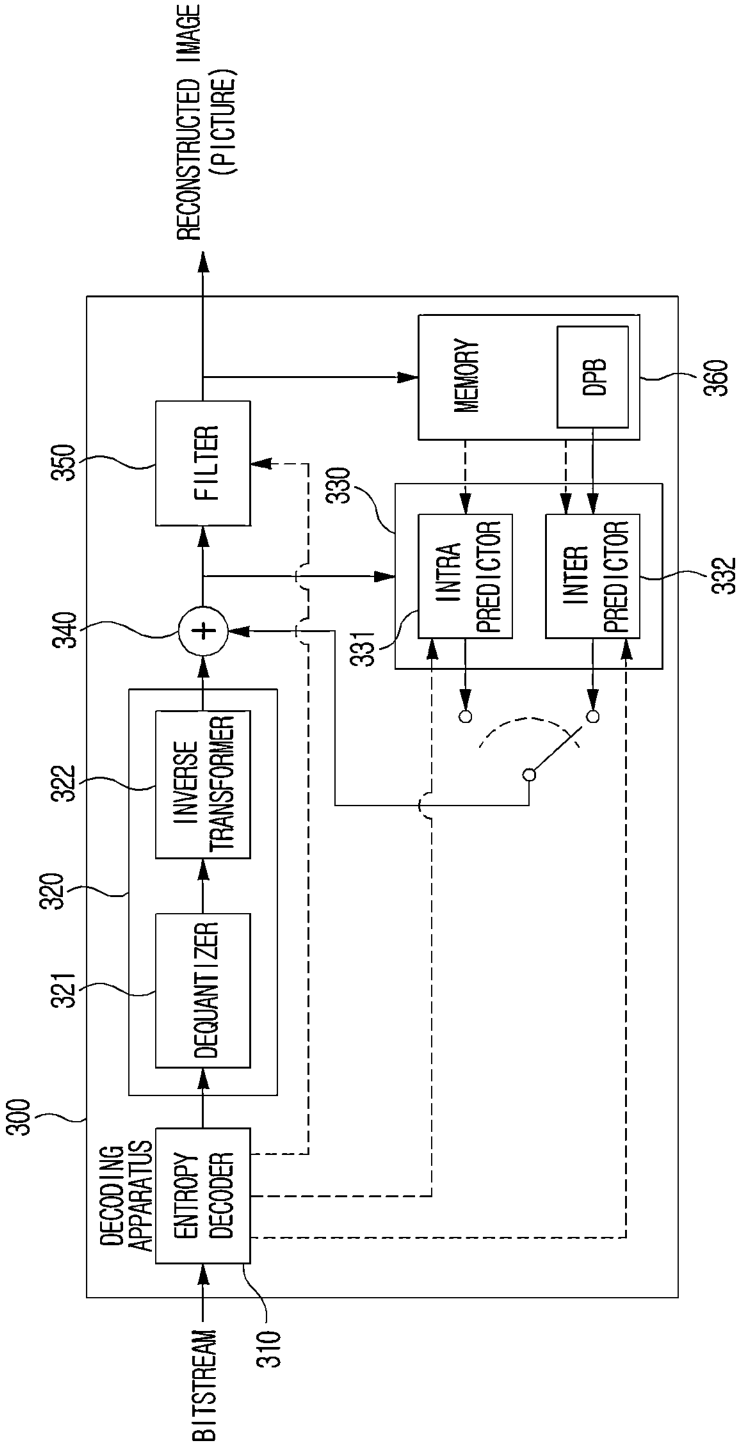
FIG. 3 shows a schematic block diagram of a decoding apparatus to which an embodiment of the present disclosure is applicable and decoding of video/image signals is performed.

FIG. 3 shows a rough block diagram of a decoding apparatus to which an embodiment of the present disclosure may be applied and decoding of a video/image signal is performed.

Referring to FIG. 3, a decoding apparatus 300 may be configured by including an entropy decoder 310, a residual processor 320, a predictor 330, an adder 340, a filter 350 and a memory 360. A predictor 330 may include an inter predictor 331 and an intra predictor 332. A residual processor 320 may include a dequantizer 321 and an inverse transformer 321.

According to an embodiment, the above-described entropy decoder 310, residual processor 320, predictor 330, adder 340 and filter 350 may be configured by one hardware component (e.g., a decoder chipset or a processor). In addition, a memory 360 may include a decoded picture buffer (DPB) and may be configured by a digital storage medium. The hardware component may further include a memory 360 as an internal/external component.

When a bitstream including video/image information is input, a decoding apparatus 300 may reconstruct an image in response to a process in which video/image information is processed in an encoding apparatus of FIG. 2. For example, a decoding apparatus 300 may derive units/blocks based on block partition-related information obtained from the bitstream. A decoding apparatus 300 may perform decoding by using a processing unit applied in an encoding apparatus. Accordingly, a processing unit of decoding may be a coding unit, and a coding unit may be partitioned from a coding tree unit or the largest coding unit according to a quad tree structure, a binary tree structure and/or a ternary tree structure. At least one transform unit may be derived from a coding unit. And, a reconstructed image signal decoded and output through a decoding apparatus 300 may be played through a playback device.

A decoding apparatus 300 may receive a signal output from an encoding apparatus of FIG. 2 in a form of a bitstream, and a received signal may be decoded through an entropy decoder 310. For example, an entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS) or a video parameter set (VPS), etc. In addition, the video/image information may further include general constraint information. A decoding apparatus may decode a picture further based on information on the parameter set and/or the general constraint information. Signaled/received information and/or syntax elements described later herein may be decoded through the decoding procedure and obtained from the bitstream. For example, an entropy decoder 310 may decode information in a bitstream based on a coding method such as exponential Golomb encoding, CAVLC, CABAC, etc. and output a value of a syntax element necessary for image reconstruction and quantized values of a transform coefficient regarding a residual. In more detail, a CABAC entropy decoding method may receive a bin corresponding to each syntax element from a bitstream, determine a context model by using syntax element information to be decoded, decoding information of a neighboring block and a block to be decoded or information of a symbol/a bin decoded in a previous step, perform arithmetic decoding of a bin by predicting a probability of occurrence of a bin according to a determined context model and generate a symbol corresponding to a value of each syntax element. In this case, a CABAC entropy decoding method may update a context model by using information on a decoded symbol/bin for a context model of a next symbol/bin after determining a context model. Among information decoded in an entropy decoder 310, information on prediction is provided to a predictor (an inter predictor 332 and an intra predictor 331), and a residual value on which entropy decoding was performed in an entropy decoder 310, i.e., quantized transform coefficients and related parameter information may be input to a residual processor 320. A residual processor 320 may derive a residual signal (a residual block, residual samples, a residual sample array). In addition, information on filtering among information decoded in an entropy decoder 310 may be provided to a filter 350. Meanwhile, a reception unit (not shown) that receives a signal output from an encoding apparatus may be further configured as an internal/external element of a decoding apparatus 300 or a reception unit may be a component of an entropy decoder 310.

Meanwhile, a decoding apparatus according to this specification may be referred to as a video/image/picture decoding apparatus, and the decoding apparatus may be divided into an information decoder (a video/image/picture information decoder) and a sample decoder (a video/image/picture sample decoder). The information decoder may include the entropy decoder 310 and the sample decoder may include at least one of dequantizer 321, the inverse transformer 322, the adder 340, the filter 350, the memory 360, the inter predictor 332 and the intra predictor 331.

A dequantizer 321 may dequantize quantized transform coefficients and output transform coefficients. A dequantizer 321 may rearrange quantized transform coefficients into a two-dimensional block form. In this case, the rearrangement may be performed based on coefficient scan order performed in an encoding apparatus. A dequantizer 321 may perform dequantization on quantized transform coefficients by using a quantization parameter (e.g., quantization step size information) and obtain transform coefficients.

An inverse transformer 322 inversely transforms transform coefficients to obtain a residual signal (a residual block, a residual sample array).

A predictor 320 may perform prediction on a current block and generate a predicted block including prediction samples for the current block. A predictor 320 may determine whether intra prediction or inter prediction is applied to the current block based on the information on prediction output from an entropy decoder 310 and determine a specific intra/inter prediction mode.

A predictor 320 may generate a prediction signal based on various prediction methods described later. For example, a predictor 320 may not only apply intra prediction or inter prediction for prediction for one block, but also may apply intra prediction and inter prediction simultaneously. It may be referred to as a combined inter and intra prediction (CIIP) mode. In addition, a predictor may be based on an intra block copy (IBC) prediction mode or may be based on a palette mode for prediction for a block. The IBC prediction mode or palette mode may be used for content image/video coding of a game, etc. such as screen content coding (SCC), etc. IBC basically performs prediction within a current picture, but it may be performed similarly to inter prediction in that it derives a reference block within a current picture. In other words, IBC may use at least one of inter prediction techniques described herein. A palette mode may be considered as an example of intra coding or intra prediction. When a palette mode is applied, information on a palette table and a palette index may be included in the video/image information and signaled.

An intra predictor 331 may predict a current block by referring to samples within a current picture. The samples referred to may be positioned in the neighborhood of the current block or may be positioned a certain distance away from the current block according to a prediction mode. In intra prediction, prediction modes may include at least one nondirectional mode and a plurality of directional modes. An intra predictor 331 may determine a prediction mode applied to a current block by using a prediction mode applied to a neighboring block.

An inter predictor 332 may derive a prediction block for a current block based on a reference block (a reference sample array) specified by a motion vector on a reference picture. In this case, in order to reduce the amount of motion information transmitted in an inter prediction mode, motion information may be predicted in a unit of a block, a sub-block or a sample based on the correlation of motion information between a neighboring block and a current block. The motion information may include a motion vector and a reference picture index. The motion information may further include inter prediction direction information (L0 prediction, Li prediction, Bi prediction, etc.). For inter prediction, a neighboring block may include a spatial neighboring block existing in a current picture and a temporal neighboring block existing in a reference picture. For example, an inter predictor 332 may configure a motion information candidate list based on neighboring blocks and derive a motion vector and/or a reference picture index of the current block based on received candidate selection information. Inter prediction may be performed based on various prediction modes, and the information on prediction may include information indicating an inter prediction mode for the current block.

An adder 340 may add an obtained residual signal to a prediction signal (a prediction block, a prediction sample array) output from a predictor (including an inter predictor 332 and/or an intra predictor 331) to generate a reconstructed signal (a reconstructed picture, a reconstructed block, a reconstructed sample array). When there is no residual for a block to be processed like when a skip mode is applied, a prediction block may be used as a reconstructed block.

An adder 340 may be referred to as a reconstructor or a reconstructed block generator. A generated reconstructed signal may be used for intra prediction of a next block to be processed in a current picture, may be output through filtering as described later or may be used for inter prediction of a next picture. Meanwhile, luma mapping with chroma scaling (LMCS) may be applied in a picture decoding process.

A filter 350 may improve subjective/objective image quality by applying filtering to a reconstructed signal. For example, a filter 350 may generate a modified reconstructed picture by applying various filtering methods to a reconstructed picture and transmit the modified reconstructed picture to a memory 360, specifically a DPB of a memory 360. The various filtering methods may include deblocking filtering, sample adaptive offset, adaptive loop filter, bilateral filter, etc.

The (modified) reconstructed picture stored in the DPB of the memory 360 can be used as a reference picture in the inter prediction unit 332. A memory 360 may store motion information of a block from which motion information in a current picture is derived (or decoded) and/or motion information of blocks in a pre-reconstructed picture. The stored motion information may be transmitted to an inter predictor 260 to be used as motion information of a spatial neighboring block or motion information of a temporal neighboring block. A memory 360 may store reconstructed samples of reconstructed blocks in a current picture and transmit them to an intra predictor 331.

Herein, embodiments described in a filter 260, an inter predictor 221 and an intra predictor 222 of an encoding apparatus 200 may be also applied equally or correspondingly to a filter 350, an inter predictor 332 and an intra predictor 331 of a decoding apparatus 300, respectively.

Figure 4:
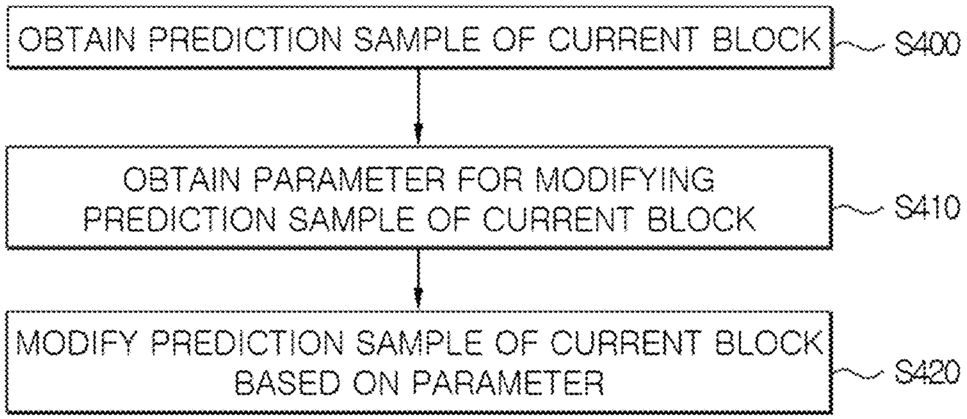
FIG. 4 illustrates an image decoding method performed by a decoding apparatus according to an embodiment of the present disclosure.

FIG. 4 illustrates an image decoding method performed by a decoding apparatus according to an embodiment of the present disclosure.

Referring to FIG. 4, a prediction sample of the current block may be obtained (S400).

The prediction sample of the current block may be obtained by inter prediction or intra prediction, or may be obtained based on a combination of inter prediction and intra prediction.

Referring to FIG. 4, the parameter for modifying the prediction sample of the current block may be obtained (S410).

The parameter may be called a modification parameter to improve prediction accuracy. For example, the modification may be to compensate for the luminance difference between the current picture to which the current block belongs and the reference picture. In this case, the parameter may be called a luminance compensation parameter (an illumination compensation parameter). Hereinafter, the parameter may be understood to mean the modification parameter or the luminance compensation parameter, and modification of the prediction sample may be understood as application of luminance compensation.

The parameter may be obtained at at least one level of a picture, tile, slice, coding tree unit (CTU), coding unit (CU), or sub-coding unit (sub-CU). In the present disclosure, for convenience of explanation, the description is based on a coding unit (CU), but of course, embodiments of the present disclosure may be applied equally/similarly to other level.

The parameter may include at least one of a weight or an offset. For example, the number of weights included in the parameter may be 1, 2, 3, or more. The number of offsets included in the parameter may be 1, 2, 3, or more. That is, for modification of one prediction sample, one or more weights and/or offsets may be used. The number of weights and the number of offsets used to modify one prediction sample may be the same or different.

The parameter may be obtained by decoding at least one of weight information and offset information included in the bitstream (Embodiment 1-A). The weight information may mean information for determining the weight or an encoded weight. The offset information may mean information for determining the offset or an encoded offset.

Alternatively, the parameter may be derived based on a predetermined reference region (Embodiment 1-B). The reference region according to the present disclosure may refer to a region referred to modify the prediction sample of the current block. The reference region may include at least one of a neighboring region of the current block or a neighboring region of the reference block.

Here, a neighboring region of the current block is a region adjacent to a current block, which may refer to a region decoded before a current block. As an example, a neighboring region of a current block may include at least one of a top neighboring region, a left neighboring region, a top-left neighboring region, a top-right neighboring region, a bottom-left neighboring region, a bottom neighboring region, a right neighboring region, or a bottom-right neighboring region of a current block. The reference block may refer to a block referred to for obtaining a prediction sample of the current block. The reference block may belong to a reference picture with a different decoding order (or output order (picture order count, POC)) than the current picture to which the current block belongs, or it may belong to the same picture as the current block. Similarly, a neighboring region of the reference block is a region adjacent to a reference block, which may refer to a region decoded before a reference block. As an example, a neighboring region of a reference block may include at least one of a top neighboring region, a left neighboring region, a top-left neighboring region, a top-right neighboring region, a bottom-left neighboring region, a bottom neighboring region, a right neighboring region, or a bottom-right neighboring region of a reference block.

Meanwhile, the parameter may be derived using all samples belonging to the reference region, or may be derived using one or more samples belonging to the reference region. This will be described in detail with reference to FIG. 5.

The reference region may be composed of a sample line (hereinafter, referred to as a first sample line) adjacent to the current block and/or the reference block, and may be composed of one or more sample lines (hereinafter, referred to as a second sample line) that are not adjacent to the current block and/or the reference block. Alternatively, the reference region may be composed of the first sample line and the second sample line. In other words, the sample in the reference region used to derive the parameter may belong to the first sample line or the second sample line. Alternatively, one of the samples in the reference region used to derive the parameter may belong to the first sample line, and any other one may belong to the second sample line. This will be described in detail with reference to FIG. 6.

The reference region may be determined based on one selected from a plurality of modes pre-defined in the decoding apparatus. The selection may be performed based on index information specifying one of a plurality of modes. Here, index information may be signaled from a bitstream. Alternatively, index information may be derived based on coding information of the current block and/or neighboring block. Here, the coding information may include at least one of size (e.g., width, height, sum/product of width and height, maximum/minimum value of width and height, etc.), shape, division type, division depth, component type, prediction mode, inter prediction mode, transform type, whether to skip transform, or quantization parameter. This will be described in detail with reference to FIG. 7.

Alternatively, a sample of a neighboring block may be selected by using encoding information of a neighboring block adjacent to a current block and/or a reference block. A sample of a selected neighboring block may be used as a reference region for deriving a parameter. Here, encoding information may include at least one of a quantization parameter, a prediction mode (intra prediction or inter prediction) of a neighboring block, or motion vector information.

For example, a sample of a neighboring block where a quantization parameter of a current block and a quantization parameter of a neighboring block satisfy a predetermined condition may be used as a neighboring sample of a current block for calculating the parameter. The predetermined condition is pre-defined in the same manner for an encoding apparatus and a decoding apparatus, which may include at least one of the following conditions.

[Condition 1] A quantization parameter of a current block and a quantization parameter of a neighboring block are less than or equal to a pre-defined specific value (or a first threshold value).

[Condition 2] A quantization parameter of a current block and a quantization parameter of a neighboring block are the same.

[Condition 3] A difference between a quantization parameter of a current block and a quantization parameter of a neighboring block is less than or equal to a pre-defined specific value (or a second threshold value).

According to the above-described condition, when a quantization parameter of a current block and a quantization parameter of a neighboring block are not the same or that difference is greater than a specific value, a sample of a corresponding neighboring block may not be used to derive a parameter.

Alternatively, a sample of a neighboring block whose prediction mode is inter prediction may be used to derive a parameter. On the other hand, when a prediction mode of a neighboring block is intra prediction, a corresponding neighboring block is judged to have low similarity with a current block, and accordingly, a sample of a corresponding neighboring block may not be used to derive a parameter.

Alternatively, when a difference between a motion vector of a neighboring block and a motion vector of a current block is less than or equal to a pre-defined specific value (or a third threshold value), a sample of a corresponding neighboring block may be used to derive a parameter. On the other hand, when a difference between a motion vector of a neighboring block and a motion vector of a current block is greater than a pre-defined specific value, two blocks are judged to be a different object, and accordingly, a sample of a corresponding neighboring block may not be used to derive a parameter.

The current block may be divided into a plurality of sub-regions based on at least one of a vertical line or a horizontal line, and each of the plurality of sub-blocks may derives the parameter by using the neighboring region adjacent to the corresponding sub-block and the neighboring region of the corresponding reference block as a reference region. One or more vertical lines and/or horizontal lines may be used to divide the current block into a plurality of sub-regions.

For convenience of explanation, it is assumed that the current block is divided into four sub-regions (i.e., top-left sub-region, top-right sub-region, bottom-left sub-region, and bottom-right sub-region) based on one vertical line and one horizontal line. However, it is not limited to this, and the current block may be divided into two, three, or more, and the current block may be divided by one of the vertical line or the horizontal line.

In the case of the top-left sub-region of the current block, the parameter may be derived based on the neighboring region adjacent to the top-left sub-region and the neighboring region of the corresponding reference block. Here, the neighboring region may include at least one of a top neighboring region, a left neighboring region, or a top-left neighboring region. The top neighboring region may have the same width as the top-left sub-region, and the left neighboring region may have the same height as the top-left sub-region. Alternatively, the top neighboring region may have the same width as the current block, and the left neighboring region may have the same height as the current block. The derived parameter may be used to modify the prediction sample belonging to the top-left sub-region.

In the case of the top-right sub-region of the current block, the parameter may be derived based on the neighboring region adjacent to the top-right sub-region and the neighboring region of the corresponding reference block. Here, the neighboring region may include at least one of the top neighboring region or the top-right neighboring region. The top neighboring region and/or the top-right neighboring region may have the same width as the top-right sub-region. Alternatively, the top neighboring region may have the same width as the current block. The derived parameter may be used to modify the prediction sample belonging to the top-right sub-region.

In the case of the bottom-left sub-region of the current block, the parameter may be derived based on the neighboring region adjacent to the bottom-left sub-region and the neighboring region of the corresponding reference block. Here, the neighboring region may include at least one of a left neighboring region or a bottom-left neighboring region. The left neighboring region and/or the bottom-left neighboring region may have the same width as the bottom-left sub-region. Alternatively, the left neighboring region may have the same width as the current block. The derived parameter may be used to modify the prediction sample belonging to the bottom-left sub-region.

In the case of the bottom-right sub-region of the current block, the default parameter pre-defined in the decoding apparatus may be applied. Here, the default parameter may mean a parameter with a weight of 1 and an offset of 0. That is, modification may be omitted for the prediction sample belonging to the bottom-right sub-region. Alternatively, the parameter for the bottom-right sub-region may be derived based on the parameter for at least one of the top-left sub-region, top-right sub-region, or bottom-left sub-region in the current block.

As described above, the current block may be divided into a plurality of sub-regions, and different parameters may be derived for sub-regions by using the neighboring region corresponding to each sub-region as a reference region.

Both the derived weight and offset may be applied to the current block. Alternatively, at least one of the weight or the offset may not be applied to the current block. To this end, whether to use at least one of the weight or offset may be determined according to the pre-defined condition. At least one of the derived weight or offset may be replaced with a pre-defined value in the encoding apparatus and the decoding apparatus. When it is determined that at least one of the weight or offset is not used according to the pre-defined condition, the weight and/or offset may be replaced with the pre-defined value in the encoding apparatus and the decoding apparatus. Depending on the position of the prediction sample in the current block that is subject to modification or the position of the sub-region in the current block to which the prediction sample belongs, at least one of the weight or offset may not be applied to the prediction sample. This is to reduce the increase in complexity of computation and implementation.

Alternatively, a variance-based luma compensation method may be used to compensate for a luma difference between a current picture and a reference picture. According to a variance-based luma compensation method, a plurality of parameters may be acquired for a current block, one final parameter may be calculated based on variance between a plurality of parameters, and luma compensation may be performed for a current block based on a calculated final parameter. The plurality of parameters may be generated at a level of at least one of a picture, a tile, a slice, a coding tree unit (CTU), a coding unit (CU), or a sub-coding unit (sub-CU), but in this embodiment, it is described based on a current block, which is a CU. Obviously, the contents described in this embodiment may be applied to other levels as well.

As described above, a degree of luma compensation depends on a value of a parameter, i.e., a weight (a) and an offset (b). When one parameter (a, b) is derived based on neighboring samples of a current block and a reference block corresponding thereto, luma compensation is also performed in only one form. Accordingly, a plurality of parameters may be derived based on neighboring samples, and luma compensation may be performed on a current block by considering variance (or a difference value) between a plurality of parameters.

As a specific example, a parameter of a current block may be obtained by using top and left samples immediately adjacent to a current block and a reference block as a reference region. A parameter here includes a weight and an offset, which are defined as a0 and b0, respectively. Meanwhile, a parameter of a current block may be obtained by using top and left samples 1-sample away from a current block and a reference block as a reference region. A parameter here includes a weight and an offset, which are defined as a1 and b1, respectively.

Finally, by considering variance between the plurality of parameters, final parameters a and b applied to a current block may be calculated as in the following Equation 1.

$$a = a0 - k*(a1 - a0)$$
$$b = b0 - k*(b1 - b0) \quad \text{[Equation 1]}$$

The method modifies a difference between a parameter (a1, b1) derived based on top and left samples 1-sample away from a current block and a reference block and a parameter (a0, b0) derived based on top and left samples adjacent to a current block and a reference block for a parameter (a0, b0) derived based on top and left samples adjacent to a current block and a reference block. A constant k represents a degree of reflecting variance and may have a real value between 0 and 1.

For example, when a k value is 1, parameters a and b applied to a current block may be calculated as in the following Equation 2.

$$a = a0 - k*(a1 - a0) = 2*a0 - a1$$
$$b = b0 - k*(b1 - b0) = 2*b0 - b1 \quad \text{[Equation 2]}$$

In other words, a first parameter may be obtained based on a reference region according to any one of a plurality of modes described above. Here, a first parameter may include at least one of a first weight or a first offset. Meanwhile, a second parameter may be obtained based on a reference region according to any one of a plurality of modes described above. Here, a second parameter may include at least one of a second weight or a second offset. By considering variance between the first parameter and the second parameter, a final parameter applied to a current block may be calculated as in the Equation 1.

In other words, the variance-based luma compensation method modifies a predetermined difference in a first parameter obtained based on any one of a plurality of modes. A predetermined difference may be calculated by using a second parameter obtained based on another one of a plurality of modes. As an example, the predetermined difference may refer to a difference between a first parameter and a second parameter. In other words, a weight (a) of a final parameter may be obtained by modifying a first weight (a0) of a first parameter based on a difference between a first weight (a0) of a first parameter and a second weight (a1) of a second parameter. Similarly, an offset (b) of a final parameter may be obtained by modifying a first offset (b0) of a first parameter based on a difference between a first offset (b0) of a first parameter and a second offset (b1) of a second parameter.

Although it was described that a plurality of parameters for a current block are derived based on a plurality of modes, this is just an example. In other words, of course, a plurality of parameters may be derived for a current block by selecting at least one of various methods for deriving a parameter described above or by a combination thereof.

Alternatively, the parameter may be obtained based on a combination of Embodiment 1-A and Embodiment 1-B described above (Embodiment 1-C). For example, the weight may be obtained from the bitstream according to Embodiment 1-A, and the offset may be derived based on the reference region according to Embodiment 1-B. Conversely, the weight may be derived based on the reference region according to Embodiment 1-B, and the offset may be obtained from the bitstream according to Embodiment 1-A.

Alternatively, the parameter may include the weight and the offset according to Embodiment 1-A and Embodiment 1-B, respectively.

The method of any one of the above-described Embodiments 1-A to 1-C may be pre-defined in the decoding apparatus, and the parameter may be obtained by the method pre-defined in the decoding apparatus. Alternatively, the parameter may be acquired selectively using one of a plurality of methods pre-defined in the decoding apparatus. Here, the plurality of methods may include at least two of the above-described Embodiments 1-A to 1-C, and a flag or index information specifying one of the plurality of methods may be signaled for the selection.

Meanwhile, the parameter according to step S410 may be adaptively obtained based on at least one of a flag indicating whether modification for the prediction sample of the current block is enabled (hereinafter referred to as the first flag) or a flag indicating whether modification is performed on the prediction sample of the current block (hereinafter referred to as the second flag). The first flag may be defined as information indicating whether luminance compensation is enabled for a sequence, picture, or slice including the current block. The second flag may be defined as information indicating whether luminance compensation is applied to the current block.

When the first flag indicates that modification for the prediction sample of the current block is not enabled, the parameter for modifying the prediction sample of the current block may not be obtained. On the other hand, when the first flag indicates that modification for the prediction sample of the current block is enabled, it may be determined, based on the second flag, whether the parameter for modifying the prediction sample of the current block is obtained. That is, when the second flag indicates that modification is performed on the prediction sample of the current block, the parameter for modifying the prediction sample of the current block may be obtained, and otherwise, the parameter for modifying the prediction sample of the current block may not be obtained.

The first flag may be signaled at at least one level of a video parameter set (VPS), sequence parameter set (SPS), picture parameter set (PPS), picture header (PH), or slice header (SH). The second flag may be signaled at at least one level of a coding tree unit (CTU), a coding unit (CU), or a transform unit (TU).

As an example, the first flag may be signaled as shown in Table 1.

TABLE 1

| | Descriptor |
|---|---|
| seq_parameter_set_rbsp( ) { | |
| ... | |
| sps_illumination_compensation_enabled_flag | u(1) |
| ... | |
| } | |

Referring to Table 1, sps_illumination_compensation_enabled_flag is an example of the first flag, may indicate whether luminance compensation is enabled, and may be signaled from a sequence parameter set.

Meanwhile, the second flag may be signaled as shown in Table 2.

TABLE 2

| | Descriptor |
|---|---|
| coding_unit( ) { | |
| ... | |
| if( sps_illumination_compensation_enabled_flag ) | |
| cu_ic_flag | ae(v) |
| ... | |
| } | |

Referring to Table 2, cu_ic_flag is an example of the second flag and indicates whether luminance compensation is applied to the current coding block, and this may be signaled at the CU level. Additionally, cu_ic_flag may be signaled only when sps_illumination_compensation_enabled_flag indicates that luminance compensation is enabled (i.e., when sps_illumination_compensation_enabled_flag is 1).

Meanwhile, the reference region according to Embodiment 1-B may be determined based on index information specifying one of a plurality of modes pre-defined in the decoding apparatus. In this case, the index information may be signaled as shown in Table 3.

TABLE 3

| | Descriptor |
|---|---|
| coding_unit( ) { | |
| ... | |
| if( sps_illumination_compensation_enabled_flag ) | |
| cu_ic_flag | ae(v) |
| if(cu_ic_flag) | |
| cu_ic_idx | ae(v) |
| ... | |
| } | |

Referring to Table 3, cu_ic_idx is an example of the above-described index information and may specify one of a plurality of modes pre-defined in the decoding apparatus. Additionally, cu_ic_idx may be signaled only when cu_ic_flag indicates that luminance compensation is applied to the current coding block (that is, when cu_ic_flag is 1).

Alternatively, one syntax in which the second flag indicating whether luminance compensation is applied to the current block and index information specifying one of a plurality of modes are merged (hereinafter, referred to as merge index information) may be used. In this case, one of the index entries of the merge index information may indicate that luminance compensation is not applied to the current block, and the remaining index entries may specify one of a plurality of modes. For example, when the value of the merge index information is 0, this may indicate that luminance compensation is not applied to the current block. The merge index information may be signaled as shown in Table 4.

TABLE 4

| | Descriptor |
|---|---|
| coding_unit( ) { | |
| ... | |
| if( sps_illumination_compensation_enabled_flag ) | |
| cu_ic_idx | ae(v) |
| ... | |
| } | |

Referring to Table 4, cu_ic_idx is an example of the above-described merge index information and may specify whether luminance compensation is applied to the current block and/or one of a plurality of modes. Additionally, cu_ic_idx may be signaled only when sps_illumination_compensation_enabled_flag indicates that luminance compensation is enabled (i.e., when sps_illumination_compensation_enabled_flag is 1).

Even if modification of the prediction sample is enabled at a higher level such as VPS, SPS, PPS, etc., a case in which there is no CU on which modification for the prediction sample is performed in the unit of a specific slice or picture may occur. In this case, signaling modification-related information (e.g., second flag, index information, merge index information, etc.) of the prediction sample for each CU may be a factor that reduces compression efficiency. Therefore, at a higher level such as slice, picture, etc., an additional syntax (hereinafter referred to as a third flag) may be needed to indicate whether a CU on which modification of the prediction sample is performed exists. The third flag may be signaled as shown in Table 5.

TABLE 5

| | Descriptor |
|---|---|
| slice_header( ) { | |
| ... | |
| if( sps_illumination_compensation_enabled_flag ) | |
| sh_ic_disabled_flag | u(1) |
| ... | |
| } | |

Referring to Table 5, sh_ic_disabled_flag is an example of the third flag described above and may indicate whether luminance compensation is enabled for the current slice. Alternatively, sh_ic_disabled_flag may indicate whether at least one coding block to which luminance compensation is applied exists in the current slice. Additionally, sh_ic_disabled_flag may be signaled only when sps_illumination_compensation_enabled_flag indicates that luminance compensation is enabled (i.e., when sps_illumination_compensation_enabled_flag is 1). Table 5 corresponds to the case where the third flag is signaled in the slice header, but the present disclosure is not limited to this, and the third flag may be signaled at a level bottom—than the sequence, such as a picture header.

When the third flag is used, the merge index information may be signaled as shown in Table 6.

TABLE 6

| | Descriptor |
|---|---|
| coding_unit( ) { | |
| ... | |
| if( sps_illumination_compensation_enabled_flag && !sh_ic_disabled_flag) | |
| cu_ic_idx | ae(v) |
| ... | |
| } | |

Referring to Table 6, cu_ic_idx is an example of the above-described merge index information and may specify whether luminance compensation is applied to the current block and/or one of a plurality of modes. Additionally, cu_ic_idx may be signaled only when sps_illumination_compensation_enabled_flag indicates that luminance compensation is enabled and sh_ic_disabled_flag indicates that luminance compensation is enabled for the current slice (i.e., sps_illumination_compensation_enabled_flag is 1 and sh_ic_disabled_flag is 0). Alternatively, cu_ic_idx may be signaled only when sh_ic_disabled_flag indicates that luminance compensation is enabled for the current slice (i.e., when sh_ic_disabled_flag is 0).

The above-described second flag and index information may be used instead of the merge index information. In this case, the second flag indicating whether luminance compensation is applied to the current block may be signaled only when sps_illumination_compensation_enabled_flag indicates that luminance compensation is enabled and sh_ic_disabled_flag indicates that luminance compensation is enabled for the current slice (i.e., sps_illumination_compensation_enabled_flag is 1 and sh_ic_disabled_flag is 0). Alternatively, the second flag may be signaled only when sh_ic_disabled_flag indicates that luminance compensation is enabled for the current slice (that is, when sh_ic_disabled_flag is 0).

Meanwhile, whether modification is performed on the prediction sample of the current block may be determined based on the coding information of the current block. Here, the coding information may include at least one of size, shape, prediction mode, division type, or transform type. The size may refer to the width, the height, the maximum/minimum value of the width and height, the sum of the width and height, or the product of the width and height.

As an example, when the size of the current block is greater than or equal to a predetermined threshold size, it may be determined that modification is performed on the prediction sample of the current block, and when the size of the current block is less than the predetermined threshold size, it may be determined that no modification is performed on the prediction samples of the current block. Here, the threshold size may mean the minimum block size for which modification for prediction samples is allowed. Alternatively, when the size of the current block is less than or equal to the predetermined threshold size, it may be determined that modification is performed on the prediction sample of the current block, and when the size of the current block is greater than the predetermined threshold size, it may be determined that no modification is performed on the prediction sample of the current block. Here, the threshold size may mean the maximum block size for which modification for the prediction sample is allowed. The threshold size may be pre-defined in the encoding apparatus and the decoding apparatus. Alternatively, information specifying the threshold size may be signaled from a bitstream. For example, the information may be signaled at least one level of video parameter set (VPS), sequence parameter set (SPS), picture parameter set (PPS), picture header (PH), slice header (SH), CTU, or CU.

As an example, when the prediction mode of the current block is the inter mode, it may be determined that modification is performed on the prediction sample of the current block. When the prediction mode of the current block is the intra mode, or intra prediction is partially performed for the current block, it may be determined that no modification is performed on the prediction sample of the current block.

As an example, when the shape of the current block is square of N×N, it may be determined that modification is performed on the prediction sample of the current block, and when the shape of the current block is non-square of M×N, it may be determined that no modification is performed on the prediction sample of the current block. Alternatively, even if the shape of the current block is non-square of M×N, It may be determined that modification is performed on the prediction sample of the current block only when at least one of the width (M) or height (N) of the current block is greater than the predetermined threshold size.

Whether modification is performed on the prediction sample of the current block may be determined based on any one of the above-described coding information, or may be determined based on a combination of at least two of the above-described coding information.

Alternatively, even when it is determined that modification is performed on the prediction sample of the current block according to the second flag indicating whether modification is performed on the prediction sample of the current block, it may be re-determined whether modification is performed on the prediction sample of the current block.

Alternatively, at least one of the above-described coding information may be used as an additional condition for parsing the second flag.

For example, when the size of the current block is greater than or equal to a predetermined threshold size, the second flag may be parsed from the bitstream, and when the size of the current block is less than the predetermined threshold size, the second flag may not be parsed from the bitstream. Alternatively, when the size of the current block is less than or equal to the predetermined threshold size, the second flag may be parsed from the bitstream, and when the size of the current block is greater than the predetermined threshold size, the second flag may not be parsed from the bitstream. The threshold size is the same as previously described, and redundant description will be omitted.

As an example, when the prediction mode of the current block is the inter mode, the second flag may be parsed from the bitstream, and when the prediction mode of the current block is the intra mode or intra prediction is partially performed on the current block, the second flag may not be parsed from the bitstream.

For example, when the shape of the current block is square of N×N, the second flag may be parsed from the bitstream, and when the current block shape is non-square of M×N, the second flag may not be parsed from the bitstream. Alternatively, even if the shape of the current block is non-square of M×N, the second flag may be parsed from the bitstream only when at least one of the width (M) or height (N) of the current block is greater than a predetermined threshold size.

Alternatively, information on whether luma compensation is applied to compensate for a luma change in a reference picture may be propagated/derived. Here, information on whether to apply luma compensation may correspond to a second flag described above. In other words, as described above, a second flag may indicate whether modification is performed on a prediction sample of a current block, and also may indicate whether luma compensation is applied to a current block.

A luma change of a reference picture may occur in various units. A luma change may affect the entire picture, or a luma change may occur partially depending on a location of a light source or lighting or a configuration or a characteristic of a video/an image. Accordingly, the derivation of a parameter according to the present disclosure may be obtained based on various units such as a picture, a slice, a tile, a coding tree unit, a coding unit, a sub-coding unit, etc.

Whether luma compensation is applied to a current block may be determined based on at least one of an inter prediction mode of a current block or a merge candidate used to derive motion information of a current block.

For example, when an inter prediction mode of a current block is a MVP mode, a second flag indicating whether luma compensation is applied may be signaled through a bitstream. As an example, as shown in Table 2, cu_ic_flag may be signaled at a level of a CU. On the other hand, when a current block is encoded in a merge mode or a skip mode, the second flag is not explicitly signaled, and a second flag of a merge candidate referred to for deriving motion information of a current block may be used as it is.

For example, when an inter prediction mode of a current block is a regular merge mode, a merge candidate list including a plurality of merge candidates may be configured, and the plurality of merge candidates may include a spatial merge candidate and/or a temporal merge candidate. Here, a spatial merge candidate may be derived by using motion information of a neighboring block spatially adjacent to a current block (hereinafter, referred to as a spatial neighboring block), and a temporal merge candidate may be derived by using motion information of a neighboring block temporally adjacent to a current block (hereinafter, referred to as a temporal neighboring block).

When a merge candidate selected for a current block is a spatial merge candidate, whether luma compensation is applied to a current block may be determined according to whether luma compensation is applied to a corresponding spatial neighboring block. However, a parameter of a current block for luma compensation may be derived based on a current block. In addition, even when a parameter is derived based on a plurality of modes described above, a current block may use a mode used by a spatial neighboring block among a plurality of modes in the same manner. However, when the spatial neighboring block is a block encoded in a CIIP mode, luma compensation may not be applied to a current block. When a merge candidate selected for a current block is a temporal merge candidate, luma compensation may not be applied to a current block. It is because information indicating whether luma compensation is applied may not be stored for an image used as a reference picture.

Alternatively, when an inter prediction mode of a current block is an affine merge mode, a merge candidate list may be configured based on at least one of an inherited candidate or a constructed candidate. Here, an inherited candidate may be a candidate derived based on a control point motion vector (CPMV) of a neighboring block encoded in an affine merge mode, and a constructed candidate may be a candidate derived by configuring a control point motion vector based on motion vectors of a plurality of neighboring blocks.

When a merge candidate selected for a current block is an inherited candidate, whether luma compensation is applied to a current block may be determined according to whether luma compensation is applied to a corresponding neighboring block. In other words, when luma compensation is applied to a corresponding neighboring block, it may be determined that luma compensation is also applied to a current block. However, a parameter of a current block for luma compensation may be derived based on a current block. In addition, even when a parameter is derived based on a plurality of modes described above, a current block may use a mode used by a corresponding neighboring block among a plurality of modes in the same manner.

Meanwhile, a constructed candidate is derived based on a combination of motion vectors of a plurality of neighboring blocks spatially adjacent to a current block, and whether luma compensation is applied may be different per neighboring block. Accordingly, when a merge candidate selected for a current block is a constructed candidate, whether luma compensation is applied to a current block may be determined by one of (1) to (3) below.

(1) When all neighboring blocks used to derive a constructed candidate of a current block use luma compensation, it may be determined that luma compensation is applied to a current block.

(2) When at least one of neighboring blocks used to derive a constructed candidate of a current block uses luma compensation, it may be determined that luma compensation is applied to a current block.

(3) When a merge candidate selected for a current block is a constructed candidate, it may be determined that luma compensation is not applied to a current block.

In addition, when a parameter is derived based on a plurality of modes, whether luma compensation is applied and/or a mode used to derive a parameter may be different per the neighboring block. Accordingly, whether luma compensation is applied to a current block may be determined by one of (1) to (5) below.

(1) When all neighboring blocks used to derive a constructed candidate use luma compensation and use the same mode, it may be determined that luma compensation is applied to a current block, and a current block may also derive a parameter by using the same mode.

(2) When all neighboring blocks used to derive a constructed candidate use luma compensation, but at least one neighboring block uses a mode different from other neighboring blocks, it may be determined that luma compensation is applied to a current block.

In this case, a parameter for luma compensation of a current block may be derived by selecting any one of a plurality of modes. Alternatively, a parameter may be derived based on each of modes used by neighboring blocks, and an average value thereof may be used as a parameter of a current block. Alternatively, a parameter may be derived based on each of a plurality of modes pre-defined in an encoding/decoding apparatus, and an average value thereof may be used as a parameter of a current block. Alternatively, a parameter may be derived by using a sample of all reference regions used to derive a parameter of neighboring blocks, and it may be used as a parameter of a current block.

(3) When one block of neighboring blocks used to derive a constructed candidate uses luma compensation or when at least two blocks of the neighboring blocks use luma compensation and the at least two blocks use the same mode, it may be determined that luma compensation is applied to a current block.

In this case, a parameter for luma compensation of a current block may be derived by selecting any one of a plurality of modes. Alternatively, a parameter for luma compensation of a current block may be derived based on the same mode as a mode used by corresponding neighboring blocks.

(4) When at least two blocks of neighboring blocks used to derive a constructed candidate use luma compensation, but any one of at least two blocks uses a mode different from the other, it may be determined that luma compensation is applied to a current block.

In this case, a parameter for luma compensation of a current block may be derived by selecting any one of a plurality of modes. Alternatively, a parameter may be derived based on each of modes used by neighboring blocks, and an average value thereof may be used as a parameter of a current block. Alternatively, a parameter may be derived based on each of a plurality of modes pre-defined in an encoding/decoding apparatus, and an average value thereof may be used as a parameter of a current block. Alternatively, a parameter may be derived by using a sample of all reference regions used to derive a parameter of neighboring blocks, and it may be used as a parameter of a current block.

(5) When a merge candidate selected for a current block is a constructed candidate, it may be determined that luma compensation is not applied to a current block.

Alternatively, when an inter prediction mode of a current block is a CIIP mode, whether luma compensation is applied to an inter prediction block of a current block may be determined by one of (1) to (3) below. Here, a CIIP mode may refer to a mode that generates each of an inter prediction block and an intra prediction block for a current block and generates a final prediction block through a weighted sum thereof. The inter prediction block may be a block generated based on a merge mode. However, it is not limited thereto, and it may be a block generated based on a MVP mode or an affine merge mode.

(1) Whether luma compensation is applied to a current block may be determined according to whether luma compensation is applied to a neighboring block used to predict a motion vector of a current block. In other words, when luma compensation is applied to a corresponding neighboring block, it may be determined that luma compensation is also applied to a current block.

(2) It may be determined that luma compensation is not applied to a current block. In addition, whether luma compensation is applied to a neighboring block used to predict a motion vector of a current block may not be propagated to other coding blocks that refer to a current block.

(3) It may be determined that luma compensation is not applied to a current block. However, whether luma compensation is applied to a neighboring block used to predict a motion vector of a current block may be propagated to other coding blocks that refer to a current block.

Referring to FIG. 4, the modified prediction sample of the current block may be obtained by modifying the prediction sample of the current block based on the parameter (S420).

All prediction samples belonging to the current block may share the parameter obtained in step S410 (hereinafter referred to as the first modification method).

According to the first modification method, a modified prediction sample may be obtained by equally applying the parameter to each prediction sample of the current block.

Alternatively, only some prediction samples belonging to the current block may share the parameter obtained in step S410 (hereinafter referred to as the second modification method).

According to the second modification method, the current block may be divided into a plurality of sub-regions based on a predetermined partition line. The modified prediction sample may be obtained by equally applying the parameter obtained in step S410 to prediction samples belonging to some sub-regions among the plurality of sub-regions. On the other hand, modification may not be performed on prediction samples belonging to the remaining sub-regions among the plurality of sub-regions. Alternatively, the default parameter pre-defined in the decoding apparatus may be applied to the prediction samples belonging to the remaining region.

For example, the default parameter may mean a parameter with a weight of 1 and an offset of 0. At least one of the size, shape, or position of the some sub-regions (or the remaining sub-regions) may be determined dependent on at least one of the size, shape, or position of the reference region.

Alternatively, the current block may be divided into a plurality of sample line groups, and different parameters may be applied to each sample line group (hereinafter referred to as the third modification method).

According to the third modification method, each sample line group may be composed of one or more sample lines. The number of sample lines belonging to one of the plurality of sample line groups may be different from the number of sample lines belonging to another one of the plurality of sample line groups. Alternatively, a plurality of sample line groups may have the same number of sample lines.

Alternatively, the modified prediction sample may be obtained through a weighted sum of the first modified prediction sample and the second modified prediction sample (hereinafter referred to as the fourth modification method). Here, the first modified prediction sample may be generated by modifying the prediction sample based on a first parameter, and the second modified prediction sample may be generated by modifying the prediction sample based on the second parameter. However, for convenience of explanation, it is assumed that the first and second modified prediction samples are each generated based on two parameters, that is, the first to Nth modified predictions may be separately generated based on N parameters, and the final modified prediction sample may be obtained through their weighted sum.

According to the fourth modification method, the first parameter may be derived based on a reference region (hereinafter referred to as a first reference region) determined based on one of the plurality of modes described above. The first modified prediction sample may be obtained based on any one of the first to third modification methods described above. Meanwhile, the second parameter may be derived based on a reference region (hereinafter referred to as a second reference region) determined based on another one of the plurality of modes described above. Likewise, the second modified prediction sample may be obtained based on any one of the first to third modification methods described above.

In this way, a plurality of parameters may be used to obtain the final modified prediction sample, and for this purpose, a plurality of index information may be used for one current block. Each index information specifies one of the plurality of modes described above, and the first reference region and the second reference region may each be determined based on the plurality of index information. The plurality of index information may be signaled from a bitstream or may be implicitly derived based on coding information of the current block and/or neighboring block. Alternatively, one of the plurality of index information may be signaled from a bitstream, and any other one may be implicitly derived based on the signaled index information.

Alternatively, as described above, the current block may be divided into a plurality of sub-blocks, and the parameter may be derived using the neighboring region adjacent to the sub-block for each sub-block as a reference region. In this case, the sub-block to which the prediction sample belongs may be specified, and the prediction sample may be modified based on the parameter corresponding to the specified sub-block (hereinafter referred to as the fifth modification method).

It will be described in detail for the above-described second, third, and fifth modification methods with reference to FIG. 8.

Modification for the prediction sample of the current block may be performed based on any one of the first to fifth modification methods described above. Alternatively, modification for the prediction sample of the current block may be performed based on a combination of at least two of the first to fifth modification methods described above.

Modification for the prediction sample of the current block may be performed selectively using one of a plurality of modification methods pre-defined in the decoding apparatus. Here, the plurality of modification methods may include at least two of the first to fifth modification methods. For the selection, index information specifying one of the plurality of modification methods may be signaled. The index information may be signaled as shown in Table 7.

TABLE 7

| | Descriptor |
|---|---|
| coding_unit( ) { | |
| ... | |
| if( sps_illumination_compensation_enabled_flag ) | |
| cu_ic_flag | ae(v) |
| if(cu_ic_flag) | |
| cu_ic_idx | ae(v) |
| ... | |
| } | |

Referring to Table 7, cu_ic_idx is an example of the above-described index information and may specify one of the plurality of modification methods pre-defined in the decoding apparatus. Additionally, cu_ic_idx may be signaled only when cu_ic_flag indicates that luminance compensation is applied to the current coding block (that is, when cu_ic_flag is 1).

Alternatively, one syntax in which a second flag indicating whether luminance compensation is applied to the current block and index information specifying one of the plurality of modification methods are merged (hereinafter, referred to as merge index information) may be used. In this case, one of the index entries of the merge index information may indicate that luminance compensation is not applied to the current block, and the remaining index entries may specify one of the plurality of modification methods. For example, when the value of the merge index information is 0, this may indicate that luminance compensation is not applied to the current block. The merge index information may be signaled as shown in Table 8.

TABLE 8

| | Descriptor |
|---|---|
| coding_unit( ) { | |
| ... | |
| if( sps_illumination_compensation_enabled_flag ) | |
| cu_ic_idx | ae(v) |
| ... | |
| } | |

Referring to Table 8, cu_ic_idx is an example of the above-described merge index information and may specify whether luminance compensation is applied to the current block and/or one of the plurality of modification methods. Additionally, cu_ic_idx may be signaled only when sps_illumination_compensation_enabled_flag indicates that luminance compensation is enabled (i.e., when sps_illumination_compensation_enabled_flag is 1).

Alternatively, a flag (hereinafter referred to as a fourth flag) indicating whether the first modification method is used to modify the prediction sample of the current block may be additionally used.

For example, when the fourth flag is 0, modification for the prediction sample may be performed according to the first modification method. On the other hand, when the fourth flag is 1, modification for the prediction sample may be performed according to the second modification method. Alternatively, when the fourth flag is 0, modification for the prediction sample may be performed according to the first modification method. On the other hand, when the fourth flag is 1, modification for the prediction sample may be performed according to the third modification method. Alternatively, when the fourth flag is 0, modification for the prediction sample may be performed according to the first modification method. On the other hand, when the fourth flag is 1, modification for the prediction sample may be performed according to the fourth modification method. Alternatively, when the fourth flag is 0, modification for the prediction sample may be performed according to the first modification method. On the other hand, when the fourth flag is 1, modification for the prediction sample may be performed according to the fifth modification method.

As an example, the fourth flag may be signaled as shown in Table 9.

TABLE 9

| | Descriptor |
|---|---|
| coding_unit( ) { | |
| ... | |
| if( sps_illumination_compensation_enabled_flag ) | |
| cu_ic_flag | ae(v) |
| cu_weighted_ic_flag | |
| if(cu_ic_flag) | |
| cu_ic_idx | ae(v) |
| ... | |
| } | |

Referring to Table 9, cu_ic_flag is an example of a second flag indicating whether luminance compensation is applied to the current block. cu_weighted_ic_flag is an example of the fourth flag described above and may indicate whether the prediction sample of the current block is modified by the first modification method. cu_ic_idx may specify one of a plurality of modes pre-defined in the decoding apparatus. The size of cu_ic_idx signaled may be different depending on the value of cu_weighted_ic_flag.

Alternatively, even when the fourth flag is used, one syntax (that is, merge index information) in which a second flag indicating whether luminance compensation is applied to the current block and index information specifying one of the plurality of modes are merged may be used.

TABLE 10

| | Descriptor |
|---|---|
| coding_unit( ) { | |
| ... | |
| if( sps_illumination_compensation_enabled_flag ) | |
| cu_ic_idx | ae(v) |
| cu_weighted_ic_flag | |
| ... | |
| } | |

Referring to Table 10, cu_ic_idx is an example of the above-described merge index information and may specify whether luminance compensation is applied to the current block and/or one of a plurality of modes. In addition, cu_weighted_ic_flag is an example of the fourth flag and may indicate whether the first modification method is used to modify the prediction sample of the current block. Since this is the same as previously described, detailed description will be omitted. cu_ic_idx and cu_weighted_ic_flag may be signaled only when sps_illumination_compensation_enabled_flag indicates that luminance compensation is enabled (i.e., when sps_illumination_compensation_enabled_flag is 1).

Alternatively, whether the first modification method is used to modify the prediction sample of the current block may be implicitly determined based on coding information of the current block and/or neighboring block such as block size/type, prediction mode, type of inter mode, division type, transform type, etc. without signaling of the fourth flag.

A current block may be reconstructed based on a modified prediction sample of a current block and a residual sample of a current block.

In an embodiment according to the present disclosure, the prediction sample of the current block is modified based on a predetermined parameter, but the present disclosure is not limited to this. That is, the parameter obtained through the above-described method may be applied to the restored sample of the current block. Here, the restored sample may mean a restored sample to which an in-loop filter is not applied. Alternatively, the restored sample may mean a restored sample to which at least one of a deblocking filter, adaptive sample offset, or adaptive loop filter has been applied.

FIGS. 5 and 6 illustrate the position of the sample within a reference region selected to derive the parameter according to an embodiment of the present disclosure.

The parameter for modifying the prediction sample of the current block may be derived using all samples belonging to the reference region, or may be derived using one or more samples belonging to the reference region. In an embodiment described later, it is assumed that the reference region is composed of a left neighboring region, a left neighboring region, and a top-left neighboring region of the current block and/or the reference block. Among the samples belonging to the reference region, the sample used to derive the parameter will be called a reference sample.

In addition to all samples belonging to the reference region, the sample belonging to at least one of the top-right neighboring region or the bottom-left neighboring region may be further used as a reference sample (Embodiment 2-A).

Figure 5C:
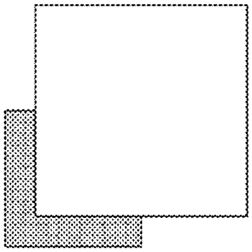
FIGS. 5 and 6 illustrate the positions of samples within a reference region selected to derive the parameter according to an embodiment of the present disclosure.
Figure 5F:
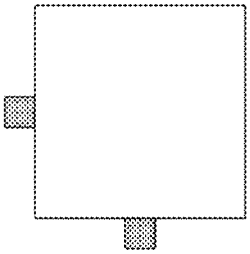
Figure 5B:
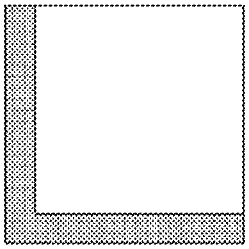
Figure 5E:
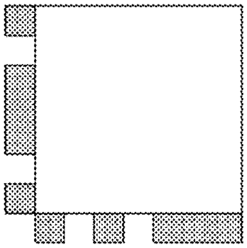
Figure 5A:
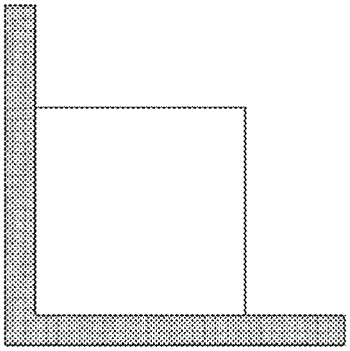

As an example, as illustrated in FIG. 5A, the parameter may be derived using samples belonging to the left neighboring region, the top neighboring region, the top-left neighboring region, the top-right neighboring region, and the bottom-left neighboring region as reference samples. However, samples belonging to the top-right neighboring region and bottom-left neighboring region may be used only when the neighboring region to which the sample belongs is available. Alternatively, when the neighboring region to which the sample belongs is not available, the sample may be replaced based on a sample of an available neighboring region. For example, when the top-right neighboring region is not available, the sample belonging to the top-right neighboring region may be replaced based on at least one of the samples belonging to the top neighboring region. When the bottom-left neighboring region is not available, the sample belonging to the bottom-left neighboring region may be replaced based on at least one of the samples belonging to the left neighboring region.

Alternatively, all samples belonging to the reference region may be used as reference samples, but samples belonging to the top-right neighboring region and the bottom-left neighboring region may not be used as reference samples (Embodiment 2-B).

As an example, as illustrated in FIG. 5B, the parameter may be derived by using samples belonging to the left neighboring region, the top neighboring region, the top-left neighboring region, the top-right neighboring region, and the bottom-left neighboring region as reference samples. Here, the height of the left neighboring region may be limited to be no greater than the height of the current block. Likewise, the width of the top neighboring region may be limited to be no greater than the width of the current block.

Alternatively, only one or more partial samples among the samples belonging to the reference region may be used as reference samples (Embodiment 2-C).

For example, as illustrated in FIG. 5C, among the samples belonging to the reference region, some samples in the left neighboring region, some samples in the top neighboring region, and the sample belonging to the top-left neighboring region may be selected as reference samples. The parameter may be derived using the selected samples. Here, some samples of the left neighboring region may include N consecutive samples starting from the topmost sample of the left neighboring region. N may be less than the height of the current block. Some samples of the top neighboring region may include M consecutive samples starting from the leftmost sample of the top neighboring region. M may be less than the width of the current block. N and M may be integers greater than or equal to 0, and N and M may be the same or different from each other.

Meanwhile, in the embodiments of FIGS. 5A to 5C, the sample belonging to the top-left neighboring region of the current block and/or the reference block is illustrated as being used as the reference sample. However, this is only an example, and the top-left neighboring region may be excluded from the reference region, and the sample belonging to the top-left neighboring region may be set not to be used as the reference sample.

Alternatively, among the samples belonging to the reference region, one or more partial samples selected at uniform intervals through subsampling may be used as reference samples (Embodiment 2-D).

Specifically, when the subsampling ratio is 2 and the width and height of the current block are each 4, two samples may be selected from the top neighboring region and two samples may be selected from the left neighboring region. Alternatively, when the subsampling ratio is 2 and the width and height of the current block are each 8, four samples may be selected from the top neighboring region and four samples may be selected from the left neighboring region.

Figure 5D:
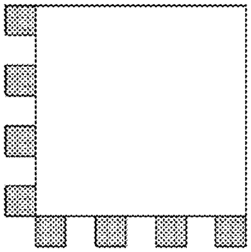

For example, as illustrated in FIG. 5D, samples subsampled at uniform intervals within the reference region according to a predetermined subsampling ratio may be used as reference samples. The subsampling rate may be predefined in the encoding apparatus and the decoding apparatus.

Alternatively, information specifying the subsampling rate may be signaled from a bitstream. For example, the information may be signaled at at least one level of video parameter set (VPS), sequence parameter set (SPS), picture parameter set (PPS), picture header (PH), slice header (SH), CTU, or CU.

Alternatively, among the samples belonging to the reference region, one or more partial samples selected at non-uniform intervals may be used as reference samples (Embodiment 2-E).

For example, as illustrated in FIG. 5E, samples selected at non-uniform intervals within the reference region may be used as reference samples.

Specifically, the value of the sample belonging to the reference region may be compared with a predetermined threshold value, a sample with a value greater than the threshold value may be selected, and the parameter may be derived by using the selected sample as a reference sample. Conversely, the value of a sample belonging to the reference region may be compared with a predetermined threshold value, a sample with a value less than or equal to the threshold value may be selected, and the parameter may be derived by using the selected sample as a reference sample.

The threshold value may be pre-defined in the encoding apparatus and the decoding apparatus. Alternatively, information specifying the threshold value may be signaled from a bitstream. For example, the information may be signaled at at least one level of video parameter set (VPS), sequence parameter set (SPS), picture parameter set (PPS), picture header (PH), slice header (SH), CTU, or CU.

Alternatively, among the samples belonging to the reference region, only one or more representative samples may be used as reference samples (Embodiment 2-F).

Here, the representative sample may mean a sample with the maximum and/or minimum value among all samples in the reference region or available samples in the reference region. The available samples in the reference region may be some samples selected according to the above-described embodiment. Alternatively, the representative sample may mean a sample at a pre-defined position in the encoding apparatus and the decoding apparatus. For example, the representative sample may include at least one of the leftmost sample of the top neighboring region, the rightmost sample of the top neighboring region, the center sample of the top neighboring region, the topmost sample of the left neighboring region, the bottommost sample of the left neighboring region, or the center sample of the left neighboring region. Meanwhile, the number of representative samples may be limited to K, where K may be 2, 4, 6, or more.

For example, as illustrated in FIG. 5F, among the samples in the reference region, two samples, that is, the sample with the maximum value and the sample with the minimum value, may be selected as reference samples. However, it is not limited to this, and the top two or more samples with the maximum value and the bottom two or more samples with the minimum value may be selected as reference samples.

Based on any one of Embodiments 2-A to 2-F described above, one or more reference samples in the reference region may be determined/selected. Alternatively, one or more reference samples in the reference region may be determined/selected based on a combination of at least two of the above-described Embodiments 2-A to 2-F.

One or more reference samples in the reference region may be determined/selected by selectively using any one of the above-described Embodiments 2-A to 2-F.

For example, a reference sample within the reference region may be determined/selected based on the size of the current block. Here, the size of the current block may mean width, height, maximum/minimum/average value of width and height, product of width and height, or sum of width and height.

Specifically, when the size of the current block is less than a predetermined threshold number, all samples belonging to the reference region may be determined as reference samples. In this case, as illustrated in FIG. 5A, the parameter may be derived by further using the samples belonging to the reference region as well as the sample belonging to at least one of the top-right neighboring region or the bottom-left neighboring region as reference samples. Alternatively, as illustrated in FIG. 5B, the parameter may be derived by using all samples belonging to the reference region as reference samples, but samples belonging to the top-right neighboring region and bottom-left neighboring region may not be used as reference samples.

On the other hand, when the size of the current block is greater than or equal to the predetermined threshold number, only some samples among the samples belonging to the reference region may be selected as reference samples. In this case, as illustrated in FIG. 5C, among the samples belonging to the reference region, some samples in the left neighboring region, some samples in the top left neighboring region, and the sample belonging to the top-left neighboring region may be selected as reference samples. Alternatively, as illustrated in FIG. 5D, samples subsampled at uniform intervals within the reference region according to a predetermined subsampling ratio may be selected as reference samples. Alternatively, as illustrated in FIG. 5E, samples selected at non-uniform intervals within the reference region may be selected as reference samples. Alternatively, as illustrated in FIG. 5F, among the samples in the reference region, two samples, that is, the sample with the maximum value and the sample with the minimum value, may be selected as reference samples.

Here, the threshold number may mean the maximum number of samples available to derive the parameter, that is, the maximum number of reference samples. The threshold number may be pre-defined in the encoding apparatus and the decoding apparatus. Alternatively, information specifying the threshold number may be signaled from a bitstream. For example, the information may be signaled at at least one level of video parameter set (VPS), sequence parameter set (SPS), picture parameter set (PPS), picture header (PH), slice header (SH), CTU, or CU.

Referring to FIG. 6, a reference region may include at least one of a first sample line or a second sample line of a current block and/or a reference block.

Figure 6C:
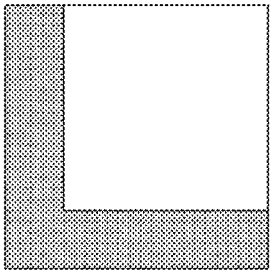
Figure 6B:
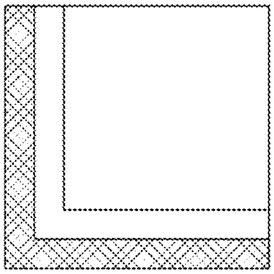
Figure 6A:
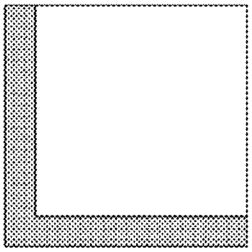

As illustrated in FIG. 6A, the reference region may be composed of a first sample line of the current block and/or the reference block. The reference sample in the reference region may be selected from a first sample line of the current block and/or reference block (Embodiment 3-A).

Alternatively, as illustrated in FIG. 6B, the reference region may be composed of a second sample line of the current block and/or reference block. The reference sample in the reference region may be selected from a second sample line of the current block and/or reference block (Embodiment 3-B).

Alternatively, as illustrated in FIG. 6C, the reference region may be composed of a first sample line and a second sample line of the current block and/or reference block. The reference sample in the reference region may be selected from a first sample line and a second sample line of the current block and/or reference block (Embodiment 3-C).

In FIGS. 6B and 6C, the reference region is illustrated as including one second sample line, but this is only an example, and the reference region may include two, three, or four second sample lines. Additionally, in FIGS. 6B and 6C, a second sample line may be adjacent to the first sample line or may be not adjacent to the first sample line.

Based on any one of the above-described Embodiments 3-A to 3-C, the range of the available reference region may be set. Alternatively, the range of the available reference region may be set based on a combination of at least two of the above-described Embodiments 3-A to 3-C.

By selectively using any one of the above-described Embodiments 3-A to 3-C, the range of the available reference region may be adaptively determined.

The selection may be performed based on information specifying one of a plurality of candidate reference regions pre-defined in the decoding apparatus. Here, the plurality of candidate reference regions may include at least two of the reference regions according to the above-described Embodiments 3-A to 3-C. The information may be signaled at at least one level of a video parameter set (VPS), sequence parameter set (SPS), picture parameter set (PPS), picture header (PH), slice header (SH), CTU, or CU.

Alternatively, one of the plurality of candidate reference regions may be implicitly selected based on coding information of the current block and/or neighboring block.

For example, one of the plurality of candidate reference regions may be selected based on the size of the current block, and the range of the available reference region may be determined based on the selected candidate reference region. Here, the size of the current block may mean width, height, maximum/minimum/average value of width and height, product of width and height, or sum of width and height.

Specifically, when the size of the current block is greater than a predetermined threshold number, a reference region composed of a first sample line of the current block and/or the reference block may be selected. Alternatively, when the size of the current block is greater than a predetermined threshold number, a reference region composed of a second sample line of the current block and/or the reference block may be selected. On the other hand, when the size of the current block is less than or equal to the predetermined threshold number, a reference region composed of the adjacent sample line and the non-adjacent sample line of the current block and/or the reference block may be selected.

Here, the threshold number may mean the minimum number of reference samples required to derive the parameter. The threshold number may be pre-defined in the encoding apparatus and the decoding apparatus. Alternatively, information specifying the threshold number may be signaled from a bitstream. For example, the information may be signaled at at least one level of video parameter set (VPS), sequence parameter set (SPS), picture parameter set (PPS), picture header (PH), slice header (SH), CTU, or CU.

Alternatively, the range of the available reference region may be adaptively determined based on a predetermined threshold value.

Specifically, a sample with a value greater than the threshold value in a first sample line of the current block and/or reference block may be selected as a reference sample. When the number of selected reference samples is less than or equal to a predetermined threshold number, the first sample line may be determined as an available reference region. On the other hand, when the number of selected reference samples is greater than the predetermined threshold number, a first sample line and a second sample line of the current block and/or reference block may be determined as the available reference region. In this case, additionally, a sample with a value greater than the threshold value in the second sample line may be selected as a reference sample.

Alternatively, a sample with a value greater than the threshold value in a second sample line of the current block and/or reference block may be selected as a reference sample. When the number of selected reference samples is less than or equal to a predetermined threshold number, the second sample line may be determined as an available reference region. On the other hand, when the number of selected reference samples is greater than the predetermined threshold number, a first sample line and a second sample line of the current block and/or reference block may be determined as the available reference region. In this case, additionally, a sample with a value greater than the threshold value in the first sample line may be selected as a reference sample.

Alternatively, a sample with a value less than or equal to the threshold value in a first sample line of the current block and/or reference block may be selected as a reference sample. When the number of selected reference samples is less than or equal to a predetermined threshold number, the first sample line may be determined as an available reference region. On the other hand, when the number of selected reference samples is greater than the predetermined threshold number, a first sample line and a second sample line of the current block and/or reference block may be determined as the available reference region. In this case, additionally, a sample with a value less than or equal to the threshold value in the second sample line may be selected as a reference sample.

Alternatively, a sample with a value less than or equal to the threshold value in a second sample line of the current block and/or reference block may be selected as a reference sample. When the number of selected reference samples is less than or equal to a predetermined threshold number, the second sample line may be determined as an available reference region. On the other hand, when the number of selected reference samples is greater than the predetermined threshold number, a first sample line and a second sample line of the current block and/or reference block may be determined as the available reference region. In this case, additionally, a sample with a value less than or equal to the threshold value in the first sample line may be selected as a reference sample.

Here, the threshold value may mean the minimum or maximum value of the sample available to derive the parameter. The threshold number may mean the minimum number of reference samples required to derive the parameter. At least one of the threshold value or the threshold number may be pre-defined in the encoding apparatus and the decoding apparatus. Alternatively, information specifying at least one of the threshold value or the threshold number may be signaled from a bitstream. For example, the information may be signaled at at least one level of video parameter set (VPS), sequence parameter set (SPS), picture parameter set (PPS), picture header (PH), slice header (SH), CTU, or CU.

FIG. 7 illustrates a plurality of modes according to an embodiment of the present disclosure.

This embodiment describes a case in which a prediction sample of a current block is modified based on a plurality of modes. In addition, a method for selecting a reference pixel used to define a plurality of modes based on a position is described. A parameter in the embodiment may be generated at a variety of levels such as a picture, a tile, a slice, a coding tree unit (CTU), a coding unit (CU), a sub-coding unit (sub-CU), etc., but here, it is described based on a current block, which is a CU. Obviously, the contents described in this embodiment may be applied to other levels as well.

As described above, a degree of luma compensation depends on a value of a parameter, i.e., a weight (a) and an offset (b). In other words, when one parameter (a, b) is derived based on neighboring samples of a current block and a reference block corresponding thereto, luma compensation is also performed in only one form. In this case, when one or more parameters are derived from neighboring samples, luma compensation may also be performed in more diverse forms.

The reference region for deriving the parameter may be determined based on at least one of a plurality of modes pre-defined in the decoding apparatus. The plurality of modes may include N modes, and N may be an integer of 2, 3, 4, or more. However, for convenience of explanation, in this embodiment, it is assumed that the plurality of modes include three modes, that is, a first mode, a second mode, and a third mode. In other words, in order to define a plurality of modes, neighboring samples of a current block and/or a reference block (hereinafter, referred to as a neighboring region) may be divided into three groups, and a method for dividing a neighboring region is described in detail below.

The neighboring region of the current block and/or reference block may be divided into three regions based on overlapped division (Embodiment 4-A).

Figures 1, 7A:
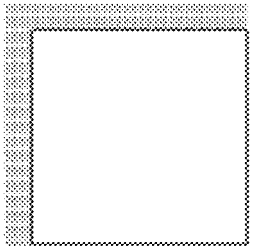
Figures 2, 7A:
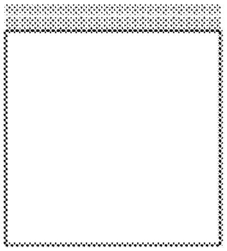
Figures 3, 7A:
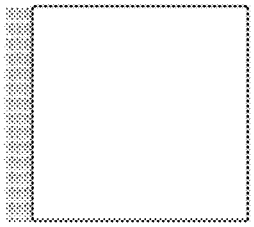

For example, the first mode may refer to a mode in which a region including at least one sample belonging to the top-left neighboring region is used as a reference region. For example, as illustrated in FIG. 7A-1, the reference region according to the first mode may be composed of a top neighboring region, a left neighboring region, and a top-left neighboring region of the current block and/or the reference block. Here, the width of the top neighboring region may be greater than or equal to the width of the current block, and the height of the left neighboring region may be greater than or equal to the height of the current block.

The second mode may refer to a mode in which a region including at least one sample belonging to the top neighboring region and not including at least one sample belonging to the top-left neighboring region is used as a reference region. For example, as illustrated in FIG. 7A-2, the reference region according to the second mode may be composed of the top neighboring region of the current block and/or the reference block. Here, the width of the top neighboring region may be greater than or equal to the width of the current block. The reference region according to the second mode may further include a top-right neighboring region of the current block and/or the reference block.

The third mode may refer to a mode in which a region including at least one sample belonging to the left neighboring region and not including at least one sample belonging to the top-left neighboring region is used as a reference region. For example, as illustrated in FIG. 7A-3, the reference region according to the third mode may be composed of the left neighboring region of the current block and/or the reference block. Here, the height of the left neighboring region may be greater than or equal to the height of the current block. The reference region according to the third mode may further include a bottom-left neighboring region of the current block and/or the reference block.

The plurality of modes may include all of the first to third modes according to Embodiment 4-A, or may include at least two of the first to third modes.

Alternatively, the neighboring region of the current block and/or reference block may be divided into three regions based on non-overlapped division (Embodiment 4-B).

Figures 1, 7B:
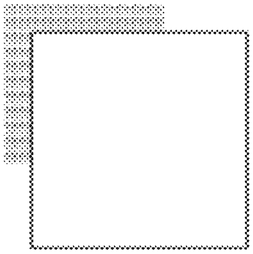
Figures 2, 7B:
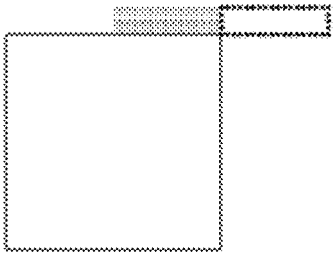
Figures 3, 7B:
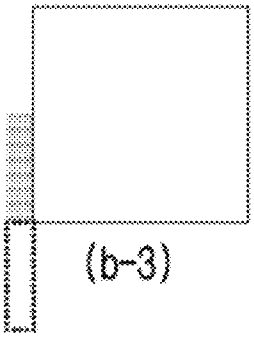

For example, the first mode may refer to a mode that uses a region including at least one sample belonging to the top-left neighboring region as a reference region. For example, as illustrated in FIG. 7B-1, the reference region according to the first mode may be composed of a top neighboring region, a left neighboring region, and a top-left neighboring region of the current block and/or the reference block. Here, the width of the top neighboring region may be less than or equal to the width of the current block.

The second mode may refer to a mode in which a region including at least one sample belonging to the top neighboring region and not including at least one sample belonging to the top-left neighboring region is used as a reference region. For example, as illustrated in FIG. 7B-2, the reference region according to the second mode may be composed of the top neighboring region of the current block and/or the reference block. Here, the width of the top neighboring region may be less than or equal to the width of the current block. When the width (nW1) of the top neighboring region in the first mode is N, the width (nW2) of the top neighboring region in the second mode may be less than or equal to a value resulting from subtracting N from the width (nWcur) of the current block. N may be an integer greater than or equal to 0 and less than or equal to nWcur. The reference region according to the second mode may further include a top-right neighboring region of the current block and/or the reference block.

The third mode may refer to a mode in which a region including at least one sample belonging to the left neighboring region and not including at least one sample belonging to the top-left neighboring region is used as a reference region. For example, as illustrated in FIG. 7B-3, the reference region according to the third mode may be composed of the left neighboring region of the current block and/or the reference block. Here, the height of the left neighboring region may be less than or equal to the height of the current block. When the height (nH1) of the left neighboring region in the first mode is M, the height (nH2) of the left neighboring region in the second mode may be less than or equal to a value resulting from subtracting M from the height (nHcur) of the current block. M may be an integer greater than or equal to 0 and less than or equal to nHcur. The reference region according to the third mode may further include a bottom-left neighboring region of the current block and/or the reference block.

The plurality of modes may include all of the first to third modes according to Embodiment 4-B, or may include at least two of the first to third modes.

A neighboring region of a current block and/or a reference block may be divided into three regions based on overlapped division (Embodiment 4-C). A neighboring region according to Embodiment 4-C may not include a sample of a top-left neighboring region of a current block and/or a reference block, unlike a neighboring region according to Embodiment 4-A.

Figures 1, 7C:
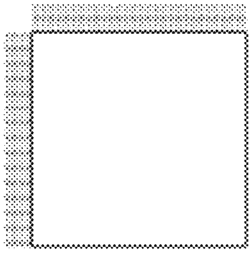
Figures 2, 7C:
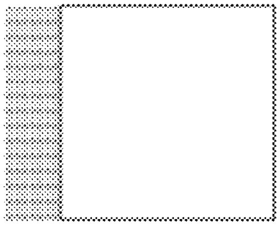
Figures 3, 7C:
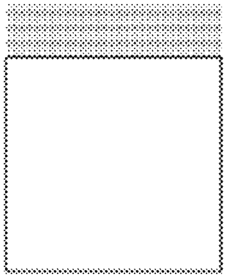

FIG. 7C-1 relates to a first mode, which may use all neighboring regions of a current block and/or a reference block as a reference region.

For example, a first mode may refer to a mode that uses a region including at least one sample belonging to a left neighboring region and at least one sample belonging to a top neighboring region as a reference region. As shown in FIG. 7C-1, a reference region according to a first mode may be composed of a top neighboring region and a left neighboring region of a current block and/or a reference block. As in a first mode, when selecting top and left samples, a size of a width and a height of a current block and/or a reference block may be used as it is, or a larger value or a smaller value between a width and a height of a current block and/or a reference block may be used. In other words, a width of a top neighboring region may be the same as a width of a current block, and a height of a left neighboring region may be the same as a height of a current block. Alternatively, a width of a top neighboring region and a height of a left neighboring region may be determined based on the maximum value or the minimum value between a width and a height of a current block. In this case, a width of a top neighboring region may be smaller or larger than a width of a current block, and a height of a left neighboring region may be smaller or larger than a height of a current block. Alternatively, regardless of a width and a height of a current block and/or a reference block, a width of a top neighboring region and a height of a left neighboring region may be configured to have the same size. In other words, even when a current block and/or a reference block are non-square, a width of a top neighboring region may be the same as a height of a left neighboring region, and in this case, a width of a top neighboring region and a height of a left neighboring region may be determined based on the maximum value or the minimum value between a width and a height of a current block and/or a reference block.

FIG. 7C-2 relates to a second mode, which may use a left neighboring region of a current block and/or a reference block as a reference region.

For example, a second mode may refer to a mode that uses a region which includes at least one sample belonging to a left neighboring region and does not include a sample belonging to a top neighboring region as a reference region. As shown in FIG. 7C-2, a reference region according to a second mode may be composed of a left neighboring region of a current block and/or a reference block. Here, a height of a left neighboring region may be the same as a height of a current block. Alternatively, a height of a left neighboring region may be smaller or larger than a height of a current block. The left neighboring region may include a first sample line and at least one second sample line. Alternatively, the left neighboring region may include a first sample line and may not include a second sample line. A reference region according to the second mode may further include at least one sample belonging to a bottom-left neighboring region of a current block and/or a reference block. A reference region of a second mode may be configured/limited to have the same number of samples as the number of samples belonging to a reference region of the first mode.

FIG. 7C-3 relates to a third mode, which may use a top neighboring region of a current block and/or a reference block as a reference region.

For example, a third mode may refer to a mode that uses a region which includes at least one sample belonging to a top neighboring region and does not include a sample belonging to a left neighboring region as a reference region. As shown in FIG. 7C-3, a reference region according to a third mode may be composed of a top neighboring region of a current block and/or a reference block. Here, a width of a top neighboring region may be the same as a width of a current block. Alternatively, a width of a top neighboring region may be smaller or larger than a width of a current block. The top neighboring region may include a first sample line and at least one second sample line. Alternatively, the top neighboring region may include a first sample line and may not include a second sample line. A reference region according to the third mode may further include at least one sample belonging to a top-right neighboring region of a current block and/or a reference block. A reference region of a third mode may be configured/limited to have the same number of samples as the number of samples belonging to a reference region of the first mode.

The plurality of modes may include all of first to third modes according to Embodiment 4-C or may include at least two of first to third modes.

Alternatively, a neighboring region of a current block and/or a reference block may be divided into three regions based on non-overlapped division (Embodiment 4-D). A neighboring region according to Embodiment 4-D, unlike a neighboring region according to Embodiment 4-B, may be divided into three regions by considering a position of a sample line configuring a neighboring region.

Figures 1, 7D:
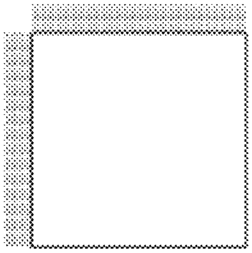
Figures 2, 7D:
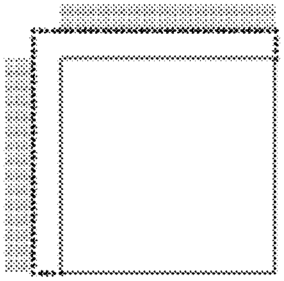
Figures 3, 7D:
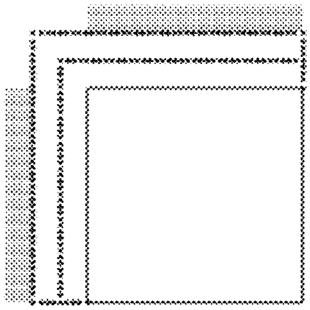

FIG. 7D-1 relates to a first mode, which may use neighboring samples adjacent to a current block and/or a reference block as a reference region.

For example, a first mode may refer to a mode that uses a region including at least one sample belonging to a first sample line of a current block and/or a reference block as a reference region. As shown in FIG. 7D-1, a reference region according to a first mode belongs to a first sample line of a current block and/or a reference block, and it may include a sample belonging to at least one of a top neighboring region or a left neighboring region of a current block and/or a reference block. Here, a width of a top neighboring region may be the same as a width of a current block, and a height of a left neighboring region may be the same as a height of a current block. Alternatively, a width of a top neighboring region and a height of a left neighboring region may be determined based on the maximum value or the minimum value between a width and a height of a current block. In this case, a width of a top neighboring region may be smaller or larger than a width of a current block, and a height of a left neighboring region may be smaller or larger than a height of a current block.

A reference region according to a first mode belongs to the same sample line as a first sample line of a current block and/or a reference block, and it may further include a sample belonging to at least one of a top-right neighboring region or a bottom-left neighboring region of a current block and/or a reference block.

FIG. 7D-2 relates to a second mode, which may use neighboring samples 1-sample away from a current block and/or a reference block as a reference region.

For example, a second mode may refer to a mode that uses a region including at least one sample belonging to a second sample line of a current block and/or a reference block as a reference region. Here, a second sample line according to a second mode may refer to a sample line adjacent to a first sample line according to a first mode. However, it is not limited thereto, and a second sample line according to a second mode may be a sample line n-samples away from a current block and/or a reference block, and n may be an integer of 2, 3, 4 or more.

As shown in FIG. 7D-2, a reference region according to a second mode belongs to a second sample line of a current block and/or a reference block, and it may include a sample belonging to at least one of a top neighboring region or a left neighboring region of a current block and/or a reference block. Here, a width of a top neighboring region may be the same as a width of a current block, and a height of a left neighboring region may be the same as a height of a current block. Alternatively, a width of a top neighboring region and a height of a left neighboring region may be determined based on the maximum value or the minimum value between a width and a height of a current block. In this case, a width of a top neighboring region may be smaller or larger than a width of a current block, and a height of a left neighboring region may be smaller or larger than a height of a current block.

A reference region according to a second mode belongs to the same sample line as a second sample line of a current block and/or a reference block, and it may further include a sample belonging to at least one of a top-right neighboring region or a bottom-left neighboring region of a current block and/or a reference block.

FIG. 7D-3 relates to a third mode, which may use neighboring samples 2-samples away from a current block and/or a reference block as a reference region.

For example, a third mode may refer to a mode that uses a region including at least one sample belonging to a second sample line of a current block and/or a reference block as a reference region. Here, a second sample line according to a third mode may refer to a sample line that is not adjacent to a first sample line according to a first mode and is adjacent to a second sample line according to a second mode. However, it is not limited thereto, and a second sample line according to a third mode may be a sample line m-samples away from a current block and/or a reference block, and m may be an integer of 2, 3, 4 or more.

As shown in FIG. 7D-3, a reference region according to a third mode belongs to a second sample line of a current block and/or a reference block, and it may include a sample belonging to at least one of a top neighboring region or a left neighboring region of a current block and/or a reference block. Here, a width of a top neighboring region may be the same as a width of a current block, and a height of a left neighboring region may be the same as a height of a current block. Alternatively, a width of a top neighboring region and a height of a left neighboring region may be determined based on the maximum value or the minimum value between a width and a height of a current block. In this case, a width of a top neighboring region may be smaller or larger than a width of a current block, and a height of a left neighboring region may be smaller or larger than a height of a current block.

A reference region according to a third mode belongs to the same sample line as a second sample line of a current block and/or a reference block, and it may further include a sample belonging to at least one of a top-right neighboring region or a bottom-left neighboring region of a current block and/or a reference block.

A width of a top neighboring region according to the first to third modes may be all the same. Similarly, a height of a left neighboring region according to the first to third modes may be all the same. Alternatively, a width of a top neighboring region according to the first mode may be smaller than a width of a top neighboring region according to the second mode, and a width of a top neighboring region according to the second mode may be smaller than a width of a top neighboring region according to the third mode. Similarly, a height of a left neighboring region according to the first mode may be smaller than a height of a left neighboring region according to the second mode, and a height of a left neighboring region according to the second mode may be smaller than a height of a left neighboring region according to the third mode.

The plurality of modes may include all of first to third modes according to Embodiment 4-D or may include at least two of first to third modes.

Alternatively, a plurality of modes according to the present disclosure may include at least two of first to third modes according to Embodiment 4-A to Embodiment 4-D (Embodiment 4-E).

Meanwhile, in the embodiments of FIGS. 7A and 7B, the top-left neighboring region of the current block and/or the reference block is illustrated as being included in the reference region, but this is only an example. The top-left neighboring region may be excluded from the reference region according to the first mode.

Alternatively, samples belonging to the neighboring region of the current block and/or reference block may be grouped into two or more groups based on one or more thresholds. For example, when one threshold (T1) is used, samples belonging to the neighboring region may be divided into two groups. Here, one of the two groups may be composed of samples less than or equal to T1, and the other may be composed of samples greater than T1. Likewise, when two thresholds (T1, T2) are used, samples belonging to the neighboring region may be divided into a first group consisting of at least one sample less than or equal to T1, a second group consisting of at least one sample greater than T1 and less than or equal to T2, and a third group consisting of at least one sample greater than T2.

For convenience of explanation, it is assumed that one threshold is used in the embodiment described later. In this case, samples belonging to the neighboring region may be divided into a first group consisting of at least one sample less than or equal to the threshold and a second group consisting of at least one sample greater than the threshold. In this case, the plurality of modes may include a first mode corresponding to the first group and a second mode corresponding to the second group. That is, the first mode may refer to a mode in which the parameter is derived using at least one sample belonging to the first group, and the second mode may refer to a mode in which the parameter is derived using at least one sample belonging to the second group.

The threshold may be pre-defined in the encoding apparatus and the decoding apparatus. Alternatively, the threshold may be derived based on the sample belonging to the neighboring region of the current block and/or the reference block. For example, the threshold may be derived as the average value, median value, mode, etc. of samples belonging to the neighboring region. Alternatively, information specifying the threshold may be signaled from a bitstream. For example, the information may be signaled at at least one level of video parameter set (VPS), sequence parameter set (SPS), picture parameter set (PPS), picture header (PH), slice header (SH), CTU, or CU.

FIG. 8 illustrates a method for modifying a prediction sample according to an embodiment of the present disclosure.

Figures 1, 8A:
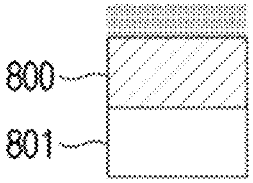
Figures 2, 8A:
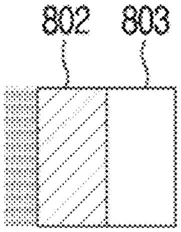
Figures 3, 8A:
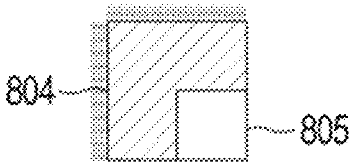
Figures 4, 8A:
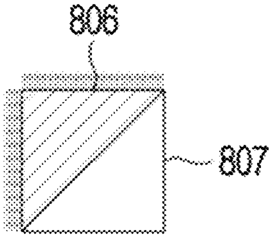

FIG. 8A shows a region to which luma compensation is applied. Alternatively, FIG. 8A shows a partial region where a prediction sample of a current block is modified. FIG. 8A relates to modification of a prediction sample according to the second modification method described with reference to FIG. 4. In other words, neighboring regions at different positions may be used to define the plurality of modes. In this case, considering the position of the neighboring region used as a reference region, the parameter may be applied to the region that have high connectivity with the neighboring region, and the parameter may not be applied to the region that have low connectivity with the neighboring region.

Specifically, FIG. 8A-1 is a case in which a sample of a top neighboring block is used when deriving a parameter, and in this case, luma compensation is applied to a region adjacent to the top within a current block. FIG. 8A-1 corresponds to a case in which a top neighboring region of a current block and/or a reference block is used as a reference region. In this case, a current block may be divided into a plurality of sub-regions by one or more horizontal division lines. The parameter derived based on the top neighboring region may be applied to the prediction sample belonging to the first sub-region (800) of the current block and may not be applied to the prediction sample belonging to the second sub-region (801). Here, the first sub-region (800) may be composed of P sample rows from the top boundary of the current block, and P may be an integer less than or equal to the height of the current block.

FIG. 8A-2 is a case in which a sample of a left neighboring block is used when deriving a compensation parameter, and in this case, luma compensation is applied to a region adjacent to the left within a current block. FIG. 8A-2 corresponds to a case where the left neighboring region of the current block and/or reference block is used as a reference region. In this case, a current block may be divided into a plurality of sub-regions by one or more vertical division lines. As an example, the parameter derived based on the left neighboring region may be applied to the prediction sample belonging to the first sub-region (802) of the current block and may not be applied to the prediction sample belonging to the second sub-region (803). Here, the first sub-region (802) may be composed of Q sample columns from the left boundary of the current block, and Q may be an integer less than or equal to the width of the current block.

The values of P and Q may be the pre-defined values in the encoding apparatus and the decoding apparatus, or may be variably determined based on at least one of the size, shape, or division type of the current block. Alternatively, information specifying a value of P and/or Q (i.e., information specifying a position of a horizontal division line and/or a vertical division line) may be signaled through a bitstream.

FIG. 8A-3 applies luma compensation to a region adjacent to the left and the top excluding a N×M bottom-right region from a current block. Here, a size of a region to which luma compensation is applied may be variably determined according to a size of a current block. Here, a value of N and M may be a value that is pre-defined in the same manner for an encoding apparatus and a decoding apparatus, or may be variably determined based on at least one of a size, a shape or a division type of a current block. Alternatively, information specifying a value of N and M (i.e., information specifying a position of a horizontal division line and a vertical division line) may be signaled through a bitstream.

FIG. 8A-3 corresponds to a case in which the left and top neighboring regions of a current block and/or a reference block are used as a reference region. However, this embodiment is not limited thereto, and it may also be applied when any one of a left neighboring region or a top neighboring region is used as a reference region. As shown in FIG. 8A-3, a current block may be divided into a first sub-region 804 and a second sub-region 805. The first sub-region 804 may refer to a region excluding a N×M bottom-right region from a current block, and a second sub-region 805 may refer to a N×M bottom-right region. Alternatively, a current block may be divided into four sub-regions, i.e., a top-left sub-region, a top-right sub-region, a bottom-left sub-region and a bottom-right sub-region, and in this case, a first sub-region may be defined as a region including at least one of a top-left sub-region, a top-right sub-region or a bottom-left sub-region and a second sub-region may be defined as a region including a bottom-right sub-region. A parameter may be applied to any one of the first sub-region and the second sub-region, and a parameter may not be applied to the other. As an example, a parameter may be applied to a prediction sample belonging to a first sub-region 804 of a current block, and a parameter may not be applied to a prediction sample belonging to a second sub-region 805.

FIG. 8A-4 applies luma compensation to a region adjacent to the left and the top based on a diagonal division line of a current block. For convenience of a description, FIG. 8A-4 shows a case in which a current block is divided into two sub-regions by a diagonal division line, but it is not limited thereto. In other words, a current block may be divided into two sub-regions by a division line having a predetermined angle, wherein a division line may be specified based on at least one of an angle or a distance from a center position of a current block. Information representing an angle and/or a distance of the division line may be signaled through a bitstream.

When a current block is divided into two sub-regions by a division line having a predetermined angle, a parameter may be applied to a prediction sample belonging to any one of two sub-regions and a parameter may not be applied to a prediction sample belonging to the other by considering a position of a reference region or adjacency to a reference region. As an example, a parameter may be applied to a prediction sample of a sub-region 806 adjacent to the reference region, and a parameter may not be applied to a prediction sample of a sub-region 807 not adjacent to the reference region.

A region to which a parameter is applied within a current block (hereinafter, referred to as a luma compensation region) may be determined based on any one of a plurality of types pre-defined in a decoding apparatus. Here, each of a plurality of types may specify at least one of a range, a size or a position of a luma compensation region. A plurality of types may include at least one of a first type in which a luma compensation region has the same size as a current block, a second type in which a luma compensation region is any one of two sub-regions generated by dividing a current block based on a horizontal division line, a third type in which a luma compensation region is any one of two sub-regions generated by dividing a current block based on a vertical division line, a fourth type in which a luma compensation region is a region excluding a N×M bottom-right region from a current block or a fifth type in which a luma compensation region is any one of two sub-regions generated by dividing a current block based on a division line having a predetermined angle. Any one of the plurality of types may be selectively used. For the selection, flag or index information indicating any one of a plurality of types may be explicitly signaled. Alternatively, any one of a plurality of types may be implicitly selected based on at least one of a size, a shape, a position or availability of a reference region for luma compensation. As an example, the second to fifth types may correspond to FIGS. 8(*a*-1) to 8(*a*-4), respectively.

Alternatively, a luma compensation region may be determined based on encoding information of a current block and/or a neighboring block. Here, encoding information may include at least one of a quantization parameter, a prediction mode (intra prediction or inter prediction) or motion information. By comparing encoding information of a current block with encoding information of a neighboring block, a luma compensation region may be selectively determined.

For example, when a quantization parameter of a neighboring block adjacent to a current block and a quantization parameter of a current block are less than or equal to a pre-defined specific value, some regions adjacent to a corresponding neighboring block within a current block may be determined as a luma compensation region.

Alternatively, when a difference between a quantization parameter of a current block and a quantization parameter of a left neighboring block is greater than a pre-defined specific value and a difference between a quantization parameter of a current block and a quantization parameter of a top neighboring block is less than or equal to a pre-defined specific value, luma compensation may not be applied to some regions adjacent to a left neighboring block within a current block and luma compensation may be applied to the remaining regions excluding the some regions.

Here, a size of the luma compensation region may be variably determined based on a size of a current block. As an example, when a width of a current block is W, a width of a luma compensation region may be the same as W/8, W/4 or W/2. Alternatively, a width of a luma compensation region within a current block may be determined as any one of integers between 1 and (W−1) according to a width of a current block. Meanwhile, when a height of a current block is H, a height of a luma compensation region may be less than or equal to H.

Alternatively, when a quantization parameter of a neighboring block adjacent to a current block and a quantization parameter of a current block are greater than a pre-defined specific value, some regions adjacent to a corresponding neighboring block within a current block may be excluded from a luma compensation region. A size of the some regions within the current block may be variably determined based on a size of a current block. As an example, when a width of a current block is W, a width of some regions within a current block may be the same as W/8, W/4 or W/2. Similarly, when a height of a current block is H, a height of some regions within a current block may be the same as H/8, H/4 or H/2. Alternatively, a width of some regions within a current block may be determined as any one of integers between 1 and (W−1) according to a width of a current block, and a height of some regions within a current block may be determined as any one of integers between 1 and (H−1) according to a height of a current block.

A luma compensation region within a current block may be determined based on a difference between a motion vector of a neighboring block and a motion vector of a current block. When a difference between a motion vector of a neighboring block and a motion vector of a current block is less than or equal to a pre-defined specific value, some regions adjacent to a corresponding neighboring block within a current block may be determined as a luma compensation region. When a difference between a motion vector of a neighboring block and a motion vector of a current block is greater than a pre-defined specific value, some regions adjacent to a corresponding neighboring block within a current block may be excluded from a luma compensation region.

Here, a size of some regions within a current block may be variably determined based on a size of a current block. As an example, when a width of a current block is W, a width of some regions within a current block may be the same as W/8, W/4 or W/2. Similarly, when a height of a current block is H, a height of some regions within a current block may be the same as H/8, H/4 or H/2. Alternatively, a width of some regions within a current block may be determined as any one of integers between 1 and (W−1) according to a width of a current block, and a height of some regions within a current block may be determined as any one of integers between 1 and (H−1) according to a height of a current block.

A luma compensation region within a current block may be determined based on a prediction mode of a neighboring block and a prediction mode of a current block. When a prediction mode of a neighboring block is the same as a prediction mode of a current block, some regions adjacent to a corresponding neighboring block within a current block may be selected as a luma compensation region. When a prediction mode of a neighboring block is different from a prediction mode of a current block, some regions adjacent to a corresponding neighboring block within a current block may be excluded from a luma compensation region.

When a parameter is applied only to some regions within a current block according to the encoding information of a neighboring block, a size of corresponding some regions may be variably determined based on at least one of a size of a current block or a difference between the encoding information of a neighboring block and the encoding information of a current block. Here, a neighboring block may include at least one of a left neighboring block or a top neighboring block of a current block. As an example, in determining a luma compensation region within a current block, both left and top neighboring blocks of a current block may be used. Alternatively, even if a top neighboring block is available, there may be a limit that a luma compensation region is determined by using only a left neighboring block of a current block. Alternatively, even if a left neighboring block is available, there may be a limit that a luma compensation region is determined by using only a top neighboring block of a current block.

The above-described pre-defined specific value may be an integer greater than or equal to 0. It may be signaled through a bitstream, and may be a value pre-defined in the same manner in an encoding apparatus and a decoding apparatus.

There may be a plurality of neighboring blocks at a left and/or top position of a current block, and in this case, at least one of a plurality of neighboring blocks may be selectively used. For convenience of a description, it is assumed that a coordinate of a top-left sample of a current block is (0, 0) and a height and a width of a current block are H and W, respectively. In this case, at least one of a plurality of neighboring blocks including each of samples with a coordinate of (−1, 0), (−1, H−1) and (−1, H) may be selected as a left neighboring block. The plurality of neighboring blocks may further include a block including a sample with a coordinate of (−1, H/2). In addition, at least one of a plurality of neighboring blocks including each of samples with a coordinate of (0, −1), (W−1, −1) and (W, −1) may be selected as a top neighboring block. The plurality of neighboring blocks may further include a block including a sample with a coordinate of (W/2, −1). A position of the neighboring block is just an example, and of course, another neighboring block adjacent to at least one of the left or the top of a current block may be used.

The encoding information of a neighboring block selected as a left neighboring block may be used as encoding information representing a left direction of a current block, and in this case, a luma compensation region of a current block may be determined based on the encoding information of a selected neighboring block. The encoding information of a neighboring block selected as a top neighboring block may be used as encoding information representing a top direction of a current block, and in this case, a luma compensation region of a current block may be determined based on the encoding information of a selected neighboring block. Alternatively, a luma compensation region may be determined for some regions within a current block corresponding to a size and a position of the left/top neighboring block.

A size of a luma compensation region within a current block may be signaled through a bitstream, or may be pre-defined in the same manner in an encoding apparatus and a decoding apparatus. As an example, when luma compensation is applied, a syntax representing a size of a luma compensation region may be signaled as in Table 11 below.

TABLE 11

| | Descriptor |
|---|---|
| seq_parameter_set_rbsp( ) { | |
| ... | |
| sps_illumination_compensation_enabled_flag | u(1) |
| if ( sps_illumination_compensation_enabled_flag ) | |
| sps_illumination_compensation_size | ue(v) |
| } | |

Referring to Table 11, sps_illumination_compensation_enabled_flag may indicate whether luma compensation is available, and may be signaled through a sequence parameter set. sps_illumination_compensation_size may represent a size of a luma compensation region. sps_illumination_compensation_size may be signaled when a value of sps_illumination_compensation_enabled_flag is 1. Table 11 shows that sps_illumination_compensation_size is signaled through a sequence parameter set, but it is just an example, and may be signaled at at least one level of a picture parameter set, a picture header, a slice header, a coding tree unit or a coding unit.

According to a value of the syntax, a luma compensation region may be determined as in the following Equation 3.

$$W' = (W \gg \text{sps\_illumination\_compensation\_size}) \quad \text{[Equation 3]}$$

$$H' = (H \gg \text{sps\_illumination\_compensation\_size})$$

Here, W and H represent a width and a height of a current block, respectively, and W' and H' represent a width and a height of a luma compensation region, respectively. In other words, luma compensation may be applied to a region from 0 to (W'−1) in a width direction and from 0 to (H'−1) in a height direction.

Alternatively, when some regions are excluded from a luma compensation region according to the encoding information of the neighboring block, a luma compensation region may be determined as in the following Equation 4.

$$W' = (W \gg \text{sps\_illumination\_compensation\_size}) \quad \text{[Equation 4]}$$

$$H' = (H \gg \text{sps\_illumination\_compensation\_size})$$

Here, W and H represent a width and a height of a current block, respectively, and W' and H' represent a width and a height of some regions to which luma compensation is not applied, respectively. In other words, luma compensation may be applied to a region from W' to (W−1) in a width direction and from H' to (H−1) in a height direction.

Alternatively, FIG. 8B relates to modification of a prediction sample according to the third modification method described with reference to FIG. 4. That is, neighboring regions at different positions may be used to define a plurality of modes. In this case, considering the position of the neighboring region used as a reference region, the parameter with a higher intensity may be applied to the region closer to the neighboring region, and the parameter with a lower intensity may be applied to the region farther to the neighboring region.

Figures 1, 8B:
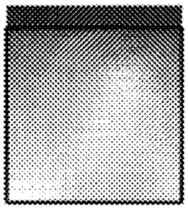
Figures 2, 8B:
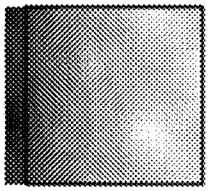

Specifically, FIG. 8B-1 corresponds to a case where the top neighboring region of the current block and/or the reference block is used as a reference region. The current block may be divided into a plurality of horizontal sample line groups, and different parameters may be applied to each horizontal sample line group. The parameter applied to each horizontal sample line group may be generated based on the parameter derived based on the top neighboring region. For example, the parameter applied to the topmost horizontal sample line group within the current block may be set to be the same as the parameter derived based on the top neighboring region. Parameters applied to the remaining horizontal sample line groups in the current block may be generated based on the parameter derived from the top neighboring region and the distance from the top boundary of the current block to the corresponding horizontal sample line group.

FIG. 8B-2 corresponds to a case where the left neighboring region of the current block and/or reference block is used as a reference region. Likewise, the current block may be divided into a plurality of vertical sample line groups, and different parameters may be applied to each vertical sample line group. Parameters applied to each vertical sample line group may be generated based on the parameter derived based on the left neighboring region. For example, the parameter applied to the leftmost vertical sample line group within the current block may be set to be the same as the parameter derived based on the left neighboring region. Parameters applied to the remaining vertical sample line groups in the current block may be generated based on the parameter derived from the left neighboring region and the distance from the left boundary of the current block to the corresponding vertical sample line group.

Alternatively, FIG. 8C relates to modification of a prediction sample according to the fifth modification method described with reference to FIG. 4. That is, neighboring regions at different positions may be used to define a plurality modes, and in this case, different parameters may be applied to each sub-region within the current block by considering the position of the prediction sample.

Figures 1, 8C:
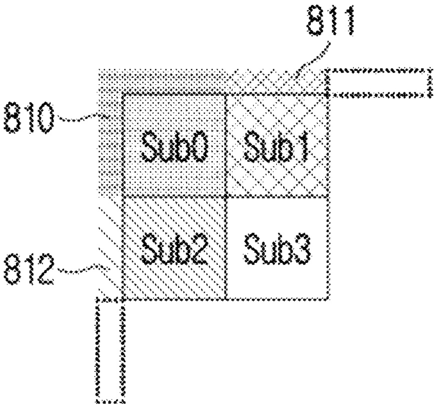
Figures 2, 8C:
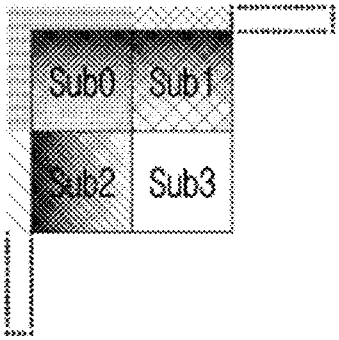

Specifically, FIG. 8C-1 corresponds to a case where different parameters are applied to each sub-region of the current block, but the same parameter is applied to prediction samples belonging to the same sub-region.

In the case of the first sub-region (Sub0) of the current block, the parameter may be derived based on the neighboring region 810 adjacent to the first sub-region and/or the neighboring region of the corresponding reference block, and the derived parameter may be applied to the prediction sample belonging to the first sub-region. In the case of the second sub-region (Sub1) of the current block, the parameter may be derived based on the neighboring region 811 adjacent to the second sub-region and/or the neighboring region of the corresponding reference block, and the derived parameter may be applied to the prediction sample belonging to the second sub-region. In the case of the third sub-region (Sub2) of the current block, the parameter may be derived based on the neighboring region 812 adjacent to the third sub-region and/or the neighboring region of the corresponding reference block, and the derived parameter may be applied to the prediction sample belonging to the third sub-region. Meanwhile, in the case of the fourth sub-region (Sub3) of the current block, since there is no neighboring region adjacent to the fourth sub-region, the parameter for the fourth sub-region may not be assigned, and the prediction sample belonging to the fourth sub-region may not be modified.

FIG. 8C-2 corresponds to a case where different parameters are applied to each sub-region of the current block, and different parameters are applied to prediction samples belonging to the same sub-region by considering the distance from the reference region corresponding to the sub-region. This is derived from a combination of the embodiment of FIG. 8C-1 and the embodiment of FIG. 8B, and detailed description will be omitted here.

Figure 9:
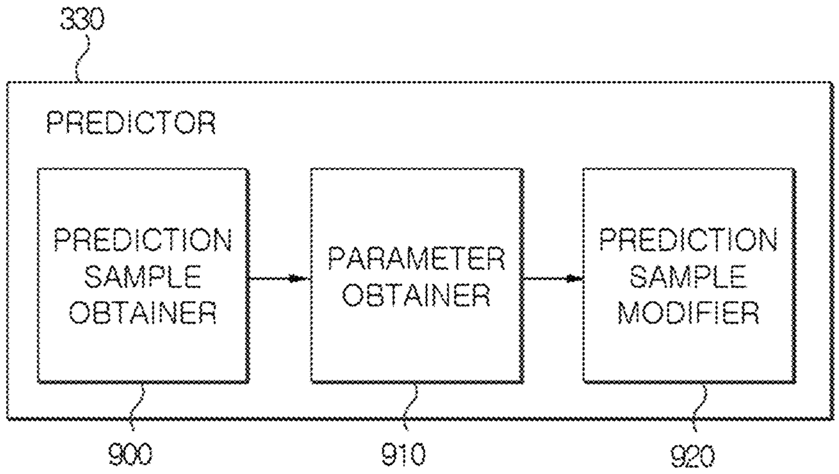
FIG. 9 illustrates a schematic configuration of a predictor 330 that performs an image decoding method according to an embodiment of the present disclosure.

FIG. 9 illustrates a schematic configuration of a predictor 330 that performs an image decoding method according to an embodiment of the present disclosure.

Referring to FIG. 9, the predictor 330 may include a prediction sample obtainer 900, a parameter obtainer 910, and a prediction sample modifier 920. This may be configured in the inter predictor 331 or the intra predictor 332 of the decoding apparatus.

The prediction sample obtainer 900 may obtain a prediction sample of the current block. Here, the prediction sample may be obtained based on at least one of inter prediction or intra prediction.

The parameter obtainer 910 may obtain the parameter for modifying the prediction sample of the current block. The parameter is for improving prediction accuracy, and may be called a modification parameter. Alternatively, the modification of the prediction sample may be to compensate for the luminance difference between the current picture to which the current block belongs and the reference picture, and in this case, the parameter may be called a luminance compensation parameter.

The parameter obtainer 910 may obtain the parameter at at least one level of a picture, tile, slice, coding tree unit (CTU), coding unit (CU), or sub-coding unit (sub-CU).

As seen with reference to FIG. 4, the parameter obtainer 910 may obtain the parameter based on at least one of Embodiments 1-A to 1-C, and detailed description will be omitted here.

The parameter obtainer 910 may obtain the parameter based on at least one of the first flag, second flag, third flag, index information, or merge index information listed in Tables 1 to 6. In this case, the parameter obtainer 910 may determine whether modification is performed on the prediction sample of the current block. Whether modification is performed on the prediction sample of the current block may be determined based on the second flag signaled through a bitstream, or may be determined based on at least one of the coding information of the current block. Alternatively, even when it is determined that modification is to be performed on the prediction sample of the current block according to the second flag, whether modification is to be performed on the prediction sample of the current block may be re-determined based on the above-described coding information. Alternatively, at least one of the above-described coding information may be used as an additional condition for parsing the second flag. This has been described in detail with reference to FIG. 4, and detailed description will be omitted here.

The prediction sample modifier 920 may modify the prediction sample of the current block based on the parameter obtained by the parameter obtainer 910 to obtain a modified prediction sample. The prediction sample of the current block may be modified based on at least one of the first to fifth modification methods, which are described with reference to FIG. 4, and detailed description will be omitted here.

In addition, as seen with reference to FIG. 4, in order to specify at least one of the first to fifth modification methods, the prediction sample modifier 920 may use index information, merge index information, or the fourth flag according to Tables 6 to 10.

Figure 10:
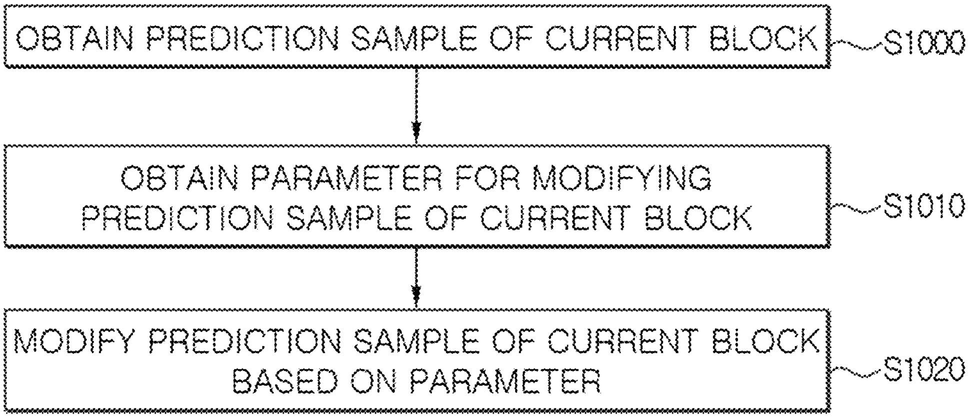
FIG. 10 illustrates an image encoding method performed by an encoding apparatus according to an embodiment of the present disclosure.

FIG. 10 illustrates an image encoding method performed by an encoding apparatus according to an embodiment of the present disclosure.

Hereinafter, the video decoding method described with reference to FIG. 4 may be applied equally/similarly to the video encoding method according to the present disclosure, and redundant description will be omitted.

Referring to FIG. 10, a prediction sample of the current block may be obtained (S1000).

The prediction sample of the current block may be obtained by inter prediction or intra prediction, or may be obtained based on a combination of inter prediction and intra prediction.

Referring to FIG. 10, the parameter for modifying the prediction sample of the current block may be determined (S1010).

The parameter is for improving the accuracy of prediction, and may be called a modification parameter. Alternatively, the modification of the prediction sample may be to compensate for the luminance difference between the current picture to which the current block belongs and the reference picture, and in this case, the parameter may be called a luminance compensation parameter.

The parameter may be determined at at least one level of picture, tile, slice, coding tree unit (CTU), coding unit (CU), or sub-coding unit (sub-CU). In the present disclosure, for convenience of explanation, the description is based on a coding unit (CU), but of course, embodiments of the present disclosure may be applied equally/similarly to other levels.

The parameter includes at least one of a weight or an offset, and one or more weights and/or weights may be determined to modify one prediction sample.

The encoding apparatus may determine the optimal parameter for modifying the prediction sample of the current block and encode it (Embodiment 1-A). That is, the encoded parameter may include at least one of weight information or offset information, which may be included in the bitstream transmitted to the decoding apparatus.

Alternatively, the parameter may be derived based on a predetermined reference region (Embodiment 1-B). The method of deriving the parameter based on the reference region is as described above with reference to FIG. 4, and detailed description will be omitted here.

Alternatively, the parameter may be determined based on a combination of Embodiment 1-A and Embodiment 1-B described above (Embodiment 1-C). For example, the weight may be encoded and inserted into the bitstream according to Embodiment 1-A, and the offset may be derived based on the reference region according to Embodiment 1-B. Conversely, the weight may be derived based on the reference region according to Embodiment 1-B, and the offset may be encoded and inserted into the bitstream according to Embodiment 1-A. Alternatively, the parameter may include weights and offsets determined according to each of Example 1-A and Example 1-B.

The method of any one of the above-described Embodiments 1-A to 1-C may be pre-defined in the encoding apparatus, and the parameter may be determined by a method pre-defined in the encoding apparatus. Alternatively, the parameter may be determined by selectively using one of a plurality of methods pre-defined in the encoding apparatus. Here, the plurality of methods include at least two of the above-described Embodiments 1-A to 1-C, and a flag or index information specifying one of the plurality of methods may be encoded.

Meanwhile, it may determine at least one of a first flag indicating whether modification for the prediction sample of the current block is enabled or a second flag indicating whether modification is performed on the prediction sample of the current block, and may encode it. The second flag may be encoded only when the first flag indicates that modification for the prediction sample of the current block is enabled.

The first flag may be encoded at at least one level of a video parameter set (VPS), sequence parameter set (SPS), picture parameter set (PPS), picture header (PH), or slice header (SH). The second flag may be encoded at at least one level of a coding tree unit (CTU), a coding unit (CU), or a transform unit (TU). For example, the first flag and the second flag may be encoded as shown in Tables 1 and 2 and inserted into the bitstream.

Meanwhile, the reference region according to Embodiment 1-B may be determined based on one of a plurality of modes pre-defined in the encoding apparatus, and index information specifying one of the plurality of modes may be encoded. For example, the index information may be encoded as shown in Table 3 and inserted into the bitstream. Alternatively, a reference region according to Embodiment 1-B may be determined based on at least two of a plurality of modes pre-defined in an encoding apparatus, and index information specifying at least two of the plurality of modes may be encoded respectively. As an example, when a variance-based luma compensation method described above is used, index information specifying a reference region (or any one of a plurality of modes) used to derive a first parameter may be encoded and inserted into a bitstream. In addition, index information specifying a reference region (or another one of a plurality of modes) used to derive a second parameter may be encoded and inserted into a bitstream.

Alternatively, one syntax in which a second flag indicating whether modification is performed on the prediction sample of the current block and index information specifying one of a plurality of modes are merged (hereinafter, referred to as merge index information) may also be encoded. In this case, one of the index entries of the merge index information may indicate that luminance compensation is not applied to the current block, and the remaining index entries may specify one of a plurality of modes. For example, when the value of the merge index information is 0, this may indicate that luminance compensation is not applied to the current block. For example, the merge index information may be encoded as shown in Table 4 and inserted into the bitstream.

Even when modification of the prediction sample is determined to be enabled at a higher level such as VPS, SPS, PPS, etc., a case where there is no CU requiring modification for the prediction sample in the unit of a specific slice or picture may occur. In this case, encoding modification-related information (e.g., second flag, index information, merge index information, etc.) of the prediction sample for each CU may be a factor that reduces compression efficiency. Accordingly, at a higher level such as slice, picture, etc., a third flag indicating whether a CU on which modification of the prediction sample is performed exists may be additionally encoded. For example, the third flag may be encoded as shown in Table 5 and inserted into the bitstream. Additionally, when the third flag is encoded, the merge index information may be encoded based on at least one of the first flag or the third flag, as seen with reference to Table 6.

Instead of the merge index information, the above-described second flag and index information may be encoded, respectively. In this case, the second flag may be encoded only when the first flag indicates that modification of the prediction sample is enabled and the third flag indicates that modification of the prediction sample is enabled for the current slice. Alternatively, the second flag may be encoded only when the third flag indicates that modification of the prediction sample is enabled for the current slice.

Meanwhile, whether modification is performed on the prediction sample of the current block may be determined based on at least one of the above-described coding information of the current block, as seen with reference to FIG. 4. The parameter may be adaptively determined based on the determination result.

Alternatively, even when the pre-encoded second flag indicates that modification is performed on the prediction sample of the current block, it may be re-determined, based on at least one of the above-described coding information of the current block, whether modification is performed on the prediction sample of the current block.

Alternatively, at least one of the above-described coding information may be used as an additional condition for encoding the second flag.

For example, when the size of the current block is greater than or equal to the predetermined threshold size, the second flag may be encoded and inserted into the bitstream, and when the size of the current block is less than the predetermined threshold size, encoding for the second flag may be omitted. Alternatively, when the size of the current block is less than or equal to the predetermined threshold size, the second flag may be encoded and inserted into the bitstream, and when the size of the current block is greater than the predetermined threshold size, encoding for the second flag may be omitted.

For example, when the prediction mode of the current block is the inter mode, the second flag may be encoded and inserted into the bitstream, and when the prediction mode of the current block is the intra mode or intra prediction is partially performed on the current block, encoding of the second flag may be omitted.

For example, when the shape of the current block is N×N square, the second flag may be encoded and inserted into the bitstream, and when the shape of the current block is M×N non-square, encoding for the second flag may be omitted. Alternatively, even when the shape of the current block is M×N non-square, the second flag may be encoded and inserted into a bitstream only when at least one of the width (M) or height (N) of the current block is greater than a predetermined threshold size.

Referring to FIG. 10, the prediction sample of the current block may be modified based on the parameter to obtain a modified prediction sample (S1020).

The modified prediction sample may be obtained based on at least one of the first to fifth modification methods.

That is, according to the first modification method, the modified prediction sample may be obtained by equally applying the parameter to each prediction sample of the current block.

Alternatively, according to the second modification method, the modified prediction samples are obtained by applying the same parameter to the prediction samples belonging to some sub-regions among the plurality of sub-regions of the current block, and modification may not be performed on the prediction samples belonging to the remaining sub-regions.

Alternatively, according to the third modification method, different parameters may be applied to each sample line group of the current block.

Alternatively, according to the fourth modification method, a first modified prediction sample and a second modified prediction sample are respectively obtained based on the first parameter and the second parameter, and the final modified prediction sample may be obtained based on a weighted sum thereof. The first parameter may be derived based on a first reference region determined based on one of a plurality of modes pre-defined in the encoding apparatus, and the second parameter may be derived based on a second reference region determined based on another one of the plurality of modes. A plurality of index information each specifying one of the plurality of modes and one of the other modes may be encoded and inserted into the bitstream. Alternatively, the plurality of index information may be implicitly derived based on coding information of the current block and/or neighboring block. Alternatively, one of the plurality of index information may be encoded and inserted into the bitstream, and another one may be implicitly derived based on the encoded index information.

Alternatively, according to the fifth modification method, the prediction sample may be modified based on the parameter corresponding to each sub-block of the current block.

Modification for the prediction sample of the current block may be performed based on at least one of the first to fifth modification methods described above. Alternatively, modification of the prediction sample of the current block may be performed selectively using one of a plurality of modification methods pre-defined in the encoding apparatus. Here, the plurality of modification methods may include at least two of the first to fifth modification methods. Index information specifying one of the plurality of modification methods may be encoded. As an example, the index information may be encoded as shown in Table 7.

Alternatively, one syntax in which a second flag indicating whether modification is performed on the prediction sample of the current block and index information specifying one of a plurality of modification methods are merged (hereinafter, referred to as merge index information) may be encoded. As an example, the merge index information may be encoded as shown in Table 8.

Alternatively, a flag (hereinafter referred to as a fourth flag) indicating whether the first modification method is used to modify the prediction sample of the current block may be additionally encoded.

For example, when it is determined that modification on the prediction sample is performed according to the first modification method, the fourth flag is encoded as 0, and when it is determined that modification on the prediction sample is performed according to the Nth modification method, the fourth flag may be encoded as 1. Here, the Nth modification method may mean any one of the second or fifth modification methods. As an example, the fourth flag may be encoded as shown in Table 9.

Alternatively, even when the fourth flag is encoded, one syntax (i.e., merge index information) in which a second flag indicating whether luminance compensation is applied to the current block and index information specifying one of a plurality of modes are merged may be encoded. For example, the merge index information may be encoded as shown in Table 10 and inserted into the bitstream.

The current block may be encoded based on a modified prediction sample of a current block. In other words, a residual sample may be obtained through a difference between an original sample of a current block and the modified prediction sample, and a bitstream may be generated by encoding the residual sample.

Figure 11:
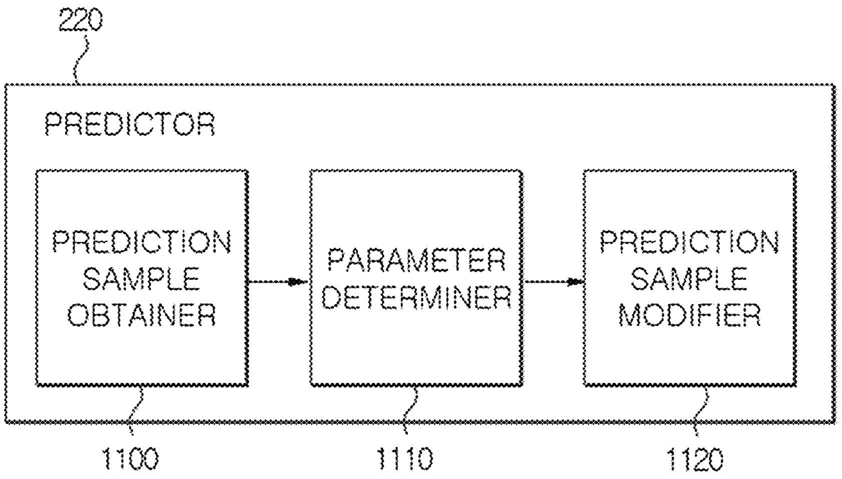
FIG. 11 illustrates a schematic configuration of a predictor 220 that performs an image encoding method according to an embodiment of the present disclosure.

FIG. 11 illustrates a schematic configuration of a predictor 220 that performs an image encoding method according to an embodiment of the present disclosure.

Referring to FIG. 11, the predictor 220 may include a prediction sample obtainer 1100, a parameter determiner 1110, and a prediction sample modifier 1120. This may be configured in the inter predictor 221 or the intra predictor 222 of the encoding apparatus.

The prediction sample obtainer 1100 may obtain the prediction sample of the current block. Here, the prediction sample may be obtained based on at least one of inter prediction or intra prediction.

The parameter determiner 1110 may determine the parameter for modifying the prediction sample of the current block. The parameter is for improving prediction accuracy, and may be called a modification parameter. Alternatively, the modification of the prediction sample may be to compensate for the luminance difference between the current picture to which the current block belongs and the reference picture, and in this case, the parameter may be called a luminance compensation parameter.

The parameter determiner 1110 determines the parameter at at least one level of a picture, tile, slice, coding tree unit (CTU), coding unit (CU), or sub-coding unit (sub-CU). In addition, the parameter determiner 1110 may determine the parameter based on at least one of Embodiments 1-A to 1-C, as seen with reference to FIG. 10, and detailed description will be omitted here.

The parameter determiner 1110 may determine at least on of a first flag indicating whether modification for the prediction sample of the current block is enabled or a second flag indicating whether modification is performed on the prediction sample of the current block. The entropy encoder 240 may encode the determined first flag and/or second flag. In this case, the second flag may be encoded only when the first flag indicates that modification for the prediction sample of the current block is enabled.

The parameter determiner 1110 may determine the reference region based on one of a plurality of modes pre-defined in the encoding apparatus, and the entropy encoder 240 may encode index information specifying one of the plurality of modes. Alternatively, the parameter determination unit 1110 may determine a reference region based on at least two of a plurality of modes pre-defined in an encoding apparatus, and an entropy encoder 240 may encode index information specifying at least two of the plurality of modes, respectively. As an example, when a variance-based luma compensation method described above is used, index information specifying a reference region (or any one of a plurality of modes) used to derive a first parameter may be encoded. In addition, index information specifying a reference region (or another one of a plurality of modes) used to derive a second parameter may be encoded.

The parameter determiner 1110 may determine one syntax in which a second flag indicating whether modification is performed on the prediction sample of the current block and index information specifying one of a plurality of modes are merged (hereinafter, referred to as merge index information), and the entropy encoder 240 may encode the merge index information.

The parameter determiner 1110 may additionally determine a third flag indicating whether there is a CU on which modification of the prediction sample is performed at a higher level such as a slice, a picture, etc., and the entropy encoder 240 may additionally encode the determined third flag. Additionally, when the third flag is encoded, the entropy encoder 240 may encode the merge index information based on at least one of the first flag or the third flag.

The parameter determiner 1110 may determine the above-described second flag and index information instead of the merge index information, and the entropy encoder 240 may encode the determined second flag and index information, respectively.

The parameter determiner 1110 may determine whether modification is performed on the prediction sample of the current block based on at least one of the above-described coding information of the current block. The parameter determiner 1110 may adaptively determine the parameter based on the determination result.

Even when the pre-determined second flag indicates that modification is performed on the prediction sample of the current block, the parameter determiner 1110 may re-determine, based on at least one of the above-described coding information of the current block, whether modification is performed on the prediction sample of the current block.

The parameter determiner 1110 may adaptively determine the second flag by using at least one of the above-described coding information as an additional condition, and the entropy encoder 240 may encode the determined second flag. This is the same as described with reference to FIG. 10, and detailed description will be omitted.

The prediction sample modifier 1120 may modify the prediction sample of the current block based on the parameter determined by the parameter determiner 1110 to obtain a modified prediction sample. The prediction sample of the current block may be modified based on at least one of the first to fifth modification methods, which were described with reference to FIG. 10, and detailed description will be omitted here.

The prediction sample modifier 1120 may modify the prediction sample of the current block by selectively using one of a plurality of modification methods pre-defined in the encoding apparatus. To this end, the prediction sample modifier 1120 may determine a modification method to be applied to the current block among a plurality of pre-defined modification methods, and the entropy encoder 240 may encode index information corresponding to the determined modification method.

The prediction sample modifier 1120 may determine one syntax in which the second flag indicating whether modification is performed on the prediction sample of the current block and index information specifying one of a plurality of modification methods are merged (hereinafter, referred to as merge index information), and the entropy encoder 240 may encode the determined merge index information. In this case, the parameter determiner 1110 may be provided in the prediction sample modifier 1120, and the parameter may be determined in the prediction sample modifier 1120.

The prediction sample modifier 1120 may determine a fourth flag indicating whether the first modification method is used to modify the prediction sample of the current block, and the entropy encoder 240 may encode the fourth flag.

In the above-described embodiment, methods are described based on a flowchart as a series of steps or blocks, but a corresponding embodiment is not limited to the order of steps, and some steps may occur simultaneously or in different order with other steps as described above. In addition, those skilled in the art may understand that steps shown in a flowchart are not exclusive, and that other steps may be included or one or more steps in a flowchart may be deleted without affecting the scope of embodiments of the present disclosure.

The above-described method according to embodiments of the present disclosure may be implemented in a form of software, and an encoding apparatus and/or a decoding apparatus according to the present disclosure may be included in a device which performs image processing such as a TV, a computer, a smartphone, a set top box, a display device, etc.

In the present disclosure, when embodiments are implemented as software, the above-described method may be implemented as a module (a process, a function, etc.) that performs the above-described function. A module may be stored in a memory and may be executed by a processor. A memory may be internal or external to a processor, and may be connected to a processor by a variety of well-known means. A processor may include an application-specific integrated circuit (ASIC), another chipset, a logic circuit and/or a data processing device. A memory may include a read-only memory (ROM), a random access memory (RAM), a flash memory, a memory card, a storage medium and/or another storage device. In other words, embodiments described herein may be performed by being implemented on a processor, a microprocessor, a controller or a chip. For example, functional units shown in each drawing may be performed by being implemented on a computer, a processor, a microprocessor, a controller or a chip. In this case, information for implementation (ex. information on instructions) or an algorithm may be stored in a digital storage medium.

In addition, a decoding apparatus and an encoding apparatus to which embodiment(s) of the present disclosure are applied may be included in a multimedia broadcasting transmission and reception device, a mobile communication terminal, a home cinema video device, a digital cinema video device, a surveillance camera, a video conversation device, a real-time communication device like a video communication, a mobile streaming device, a storage medium, a camcorder, a device for providing video on demand (VoD) service, an over the top video (OTT) device, a device for providing Internet streaming service, a three-dimensional (3D) video device, a virtual reality (VR) device, an argumente reality (AR) device, a video phone video device, a transportation terminal (ex. a vehicle (including an autonomous vehicle) terminal, an airplane terminal, a ship terminal, etc.) and a medical video device, etc., and may be used to process a video signal or a data signal. For example, an over the top video (OTT) device may include a game console, a blu-ray player, an Internet-connected TV, a home theater system, a smartphone, a tablet PC, a digital video recorder (DVR), etc.

In addition, a processing method to which embodiment(s) of the present disclosure are applied may be produced in a form of a program executed by a computer and may be stored in a computer-readable recording medium. Multimedia data having a data structure according to embodiment(s) of the present disclosure may be also stored in a computer-readable recording medium. The computer-readable recording medium includes all types of storage devices and distributed storage devices that store computer-readable data. The computer-readable recording medium may include, for example, a blu-ray disk (BD), an universal serial bus (USB), ROM, PROM, EPROM, EEPROM, RAM, CD-ROM, a magnetic tape, a floppy disk and an optical media storage device. In addition, the computer-readable recording medium includes media implemented in a form of a carrier wave (e.g., transmission via the Internet). In addition, a bitstream generated by an encoding method may be stored in a computer-readable recording medium or may be transmitted through a wired or wireless communication network.

In addition, embodiment(s) of the present disclosure may be implemented by a computer program product by a program code, and the program code may be executed on a computer by embodiment(s) of the present disclosure. The program code may be stored on a computer-readable carrier.

Figure 12:
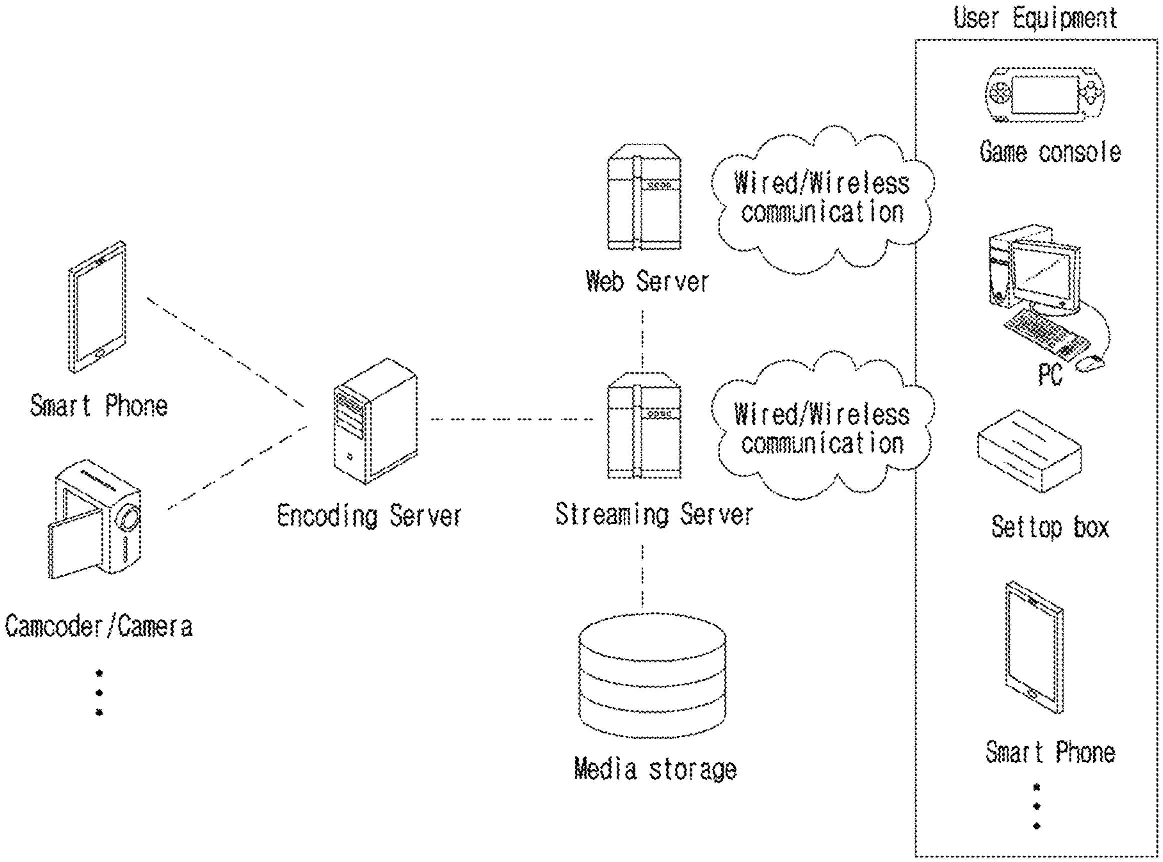
FIG. 12 shows an example of a contents streaming system to which embodiments of the present disclosure may be applied.

FIG. 12 shows an example of a contents streaming system to which embodiments of the present disclosure may be applied.

Referring to FIG. 12, a contents streaming system to which embodiment(s) of the present disclosure are applied may largely include an encoding server, a streaming server, a web server, a media storage, a user device and a multimedia input device.

The encoding server generates a bitstream by compressing contents input from multimedia input devices such as a smartphone, a camera, a camcorder, etc. into digital data and transmits it to the streaming server. As another example, when multimedia input devices such as a smartphone, a camera, a camcorder, etc. directly generate a bitstream, the encoding server may be omitted.

The bitstream may be generated by an encoding method or a bitstream generation method to which embodiment(s) of the present disclosure are applied, and the streaming server may temporarily store the bitstream in a process of transmitting or receiving the bitstream.

The streaming server transmits multimedia data to a user device based on a user's request through a web server, and the web server serves as a medium to inform a user of what service is available. When a user requests desired service from the web server, the web server delivers it to a streaming server, and the streaming server transmits multimedia data to a user. In this case, the contents streaming system may include a separate control server, and in this case, the control server controls a command/a response between each device in the content streaming system.

The streaming server may receive contents from a media storage and/or an encoding server. For example, when contents is received from the encoding server, the contents may be received in real time. In this case, in order to provide smooth streaming service, the streaming server may store the bitstream for a certain period of time.

An example of the user device may include a mobile phone, a smart phone, a laptop computer, a digital broadcasting terminal, a personal digital assistants (PDAs), a portable multimedia players (PMP), a navigation, a slate PC, a Tablet PC, an ultrabook, a wearable device (e.g., a smartwatch, a smart glass, a head mounted display (HMD), a digital TV, a desktop, a digital signage, etc.

Each server in the contents streaming system may be operated as a distributed server, and in this case, data received from each server may be distributed and processed.

The claims set forth herein may be combined in various ways. For example, a technical characteristic of a method claim of the present disclosure may be combined and implemented as a device, and a technical characteristic of a device claim of the present disclosure may be combined and implemented as a method. In addition, a technical characteristic of a method claim of the present disclosure and a technical characteristic of a device claim may be combined and implemented as a device, and a technical characteristic of a method claim of the present disclosure and a technical characteristic of a device claim may be combined and implemented as a method.

The invention claimed is:

1. An image decoding method, comprising:
obtaining a prediction sample of a current block;
deriving, based on one of a plurality of modes, a parameter for modifying the prediction sample of the current block; and
modifying the prediction sample of the current block based on the parameter,
wherein the parameter includes at least one of a weight or an offset applied to the prediction sample,
wherein the plurality of modes includes at least two of a first mode for deriving the parameter using, as a reference region, a top neighboring region and a left neighboring region of the current block, a second mode for deriving the parameter using, as the reference region, a left neighboring region of the current block, or a third mode for deriving the parameter using, as the reference region, a top neighboring region of the current block, and
wherein the left neighboring region of the second mode includes a sample line that is not adjacent to the current block, and the top neighboring region of the third mode includes a sample line that is not adjacent to the current block.

2. The method of claim 1, wherein the one of the plurality of modes is determined based on encoding information of a neighboring block adjacent to the current block, and
wherein the encoding information includes at least one of a quantization parameter, a prediction mode, or motion information.

3. The method of claim 1, wherein the parameter is derived based on one or more samples selected from samples belonging to the reference region, and
wherein the one or more samples are selected based on at least one of a size of the current block, a sub-sampling for the reference region, or a representative sample of the samples belonging to the reference region.

4. The method of claim 1, further comprising:
deriving, based on another one of the plurality of modes, an additional parameter for modifying the prediction sample of the current block; and
deriving a final parameter for the current block based on the parameter and the additional parameter,
wherein the prediction sample is modified by applying the final parameter to the prediction sample.

5. The method of claim 1, wherein a region to which the parameter is applied within the current block is determined based on one or more pre-defined types, and
wherein the one or more pre-defined types include at least one of a first type in which the region to which the parameter is applied has a same size as the current block, a second type in which the region to which the parameter is applied is any one of two sub-regions generated by dividing the current block based on a horizontal division line, a third type in which the region to which the parameter is applied is any one of two sub-regions generated by dividing the current block based on a vertical division line, a fourth type in which the region to which the parameter is applied is a region excluding a bottom-right sub-region within the current block, or a fifth type in which the region to which the parameter is applied is any one of two sub-regions generated by dividing the current block based on a division line having a predetermined angle.

6. The method of claim 1, wherein a region to which the parameter is applied within the current block is determined based on encoding information of at least one of the current block or a neighboring block adjacent to the current block, and
wherein the encoding information includes at least one of a quantization parameter, a prediction mode, or motion information.

7. The method of claim 1,
wherein whether to modify the prediction sample is determined based on an inter prediction mode of the current block or a merge candidate for deriving motion information of the current block.

8. An image encoding method, comprising:
obtaining a prediction sample of a current block;
deriving, based on one of a plurality of modes, a parameter for modifying the prediction sample of the current block; and
modifying the prediction sample of the current block based on the parameter,
wherein the parameter includes at least one of a weight or an offset applied to the prediction sample,
wherein the plurality of modes includes at least two of a first mode for deriving the parameter using, as a reference region, a top neighboring region and a left neighboring region of the current block, a second mode for deriving the parameter using, as the reference region, a left neighboring region of the current block, or a third mode for deriving the parameter using, as the reference region, a top neighboring region of the current block, and
wherein the left neighboring region of the second mode includes a sample line that is not adjacent to the current block, and the top neighboring region of the third mode includes a sample line that is not adjacent to the current block.

9. A non-transitory computer-readable storage medium storing a bitstream generated by an image encoding method, the image encoding method comprising:
obtaining a prediction sample of a current block;
deriving, based on one of a plurality of modes, a parameter for modifying the prediction sample of the current block; and
modifying the prediction sample of the current block based on the parameter,
wherein the parameter includes at least one of a weight or an offset applied to the prediction sample,
wherein the plurality of modes includes at least two of a first mode for deriving the parameter using, as a reference region, a top neighboring region and a left neighboring region of the current block, a second mode for deriving the parameter using, as the reference region, a left neighboring region of the current block, or a third mode for deriving the parameter using, as the reference region, a top neighboring region of the current block, and
wherein the left neighboring region of the second mode includes a sample line that is not adjacent to the current block, and the top neighboring region of the third mode includes a sample line that is not adjacent to the current block.

10. A method for transmitting data for image information, the method comprising:
obtaining a prediction sample of a current block;
deriving, based on one of a plurality of modes, a parameter for modifying the prediction sample of the current block;

modifying the prediction sample of the current block based on the parameter;

encoding the current block based on the modified prediction sample to generate a bitstream; and transmitting the data including the bitstream, wherein the parameter includes at least one of a weight or an offset applied to the prediction sample, wherein the plurality of modes includes at least two of a first mode for deriving the parameter using, as a reference region, a top neighboring region and a left neighboring region of the current block, a second mode for deriving the parameter using, as the reference region, a left neighboring region of the current block, or a third mode for deriving the parameter using, as the reference region, a top neighboring region of the current block, and wherein the left neighboring region of the second mode includes a sample line that is not adjacent to the current block, and the top neighboring region of the third mode includes a sample line that is not adjacent to the current block.

* * * * *